(12) United States Patent
Fujihara

(10) Patent No.: US 12,506,381 B2
(45) Date of Patent: Dec. 23, 2025

(54) MOTOR

(71) Applicant: MINEBEA MITSUMI Inc., Nagano (JP)

(72) Inventor: Hiroki Fujihara, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 442 days.

(21) Appl. No.: 17/288,102

(22) PCT Filed: Oct. 25, 2019

(86) PCT No.: PCT/JP2019/042046
§ 371 (c)(1),
(2) Date: Apr. 23, 2021

(87) PCT Pub. No.: WO2020/090686
PCT Pub. Date: May 7, 2020

(65) Prior Publication Data
US 2021/0376689 A1 Dec. 2, 2021

(30) Foreign Application Priority Data
Oct. 29, 2018 (JP) .................................. 2018-203334

(51) Int. Cl.
*H02K 5/22* (2006.01)
*H02K 5/14* (2006.01)
*H02K 11/25* (2016.01)

(52) U.S. Cl.
CPC ............ *H02K 5/225* (2013.01); *H02K 5/148* (2013.01); *H02K 11/25* (2016.01)

(58) Field of Classification Search
USPC .............................................. 310/68 R–68 E
See application file for complete search history.

(56) References Cited

U.S. PATENT DOCUMENTS

| 2005/0258691 A1* | 11/2005 | Furuki ................... H02K 23/66 310/239 |
| 2010/0270879 A1* | 10/2010 | Matsushita .......... H02K 11/026 310/71 |

(Continued)

FOREIGN PATENT DOCUMENTS

| CA | 2 895 591 A1 | 7/2014 |
| JP | H05-002575 U | 1/1993 |

(Continued)

OTHER PUBLICATIONS

English translation of the Written Opinion for corresponding International Application No. PCT/JP2019/042046 dated Dec. 24, 2019.

(Continued)

*Primary Examiner* — Oluseye Iwarere
*Assistant Examiner* — Minki Chang
(74) *Attorney, Agent, or Firm* — Chrisman Gallo Tochtrop LLC

(57) ABSTRACT

A motor includes a motor body including a bottom part and a motor terminal 26 provided at the bottom part, and a terminal unit 200 mounted at the bottom part of the motor body. The terminal unit 200 includes a holder 210, a PTC thermistor 180 and a terminal part 330b fixed to the holder 210, and a wiring part electrically connecting the motor terminal 26 and the terminal part 330b. The PTC thermistor 180 is provided at the wiring part. In the radial direction, the terminal part 330b and the PTC thermistor 180 are arranged and facing each other.

8 Claims, 19 Drawing Sheets

(56) References Cited

U.S. PATENT DOCUMENTS

| | | | |
|---|---|---|---|
| 2011/0140554 A1* | 6/2011 | Wong | H02K 1/17 310/72 |
| 2018/0091025 A1 | 3/2018 | Kuroda | |
| 2018/0316249 A1* | 11/2018 | Tanaka | H02K 5/145 |

FOREIGN PATENT DOCUMENTS

| JP | H10-189092 A | 7/1998 |
|---|---|---|
| JP | 2007-259546 A | 10/2007 |
| JP | 2009-165209 A | 7/2009 |
| JP | 2011-125215 A | 6/2011 |
| JP | 2017-117572 A | 6/2017 |

OTHER PUBLICATIONS

International Search Report for corresponding International Application No. PCT/JP2019/042046 mailed Dec. 24, 2019.
Written Opinion for corresponding International Application No. PCT/JP2019/042046 dated Dec. 24, 2019.
Japanese Office Action mailed Jan. 11, 2022 for corresponding Japanese Application No. 2020-553862 and English translation.
First Chinese Office Action dated Jun. 28, 2024 for corresponding Chinese Application No. 201980068220.9 and English translation.
Second Chinese Office Action dated Nov. 22, 2024 for corresponding Chinese Application No. 201980068220.9 and English translation.

* cited by examiner (UPPER) ← A1 (LOWER)

MOTOR

FIELD

The present invention relates to a motor, and particularly relates to a motor including a terminal unit including a terminal for feeding power to the motor.

BACKGROUND

An electronic component such as a circuit element is provided in a power supply line of a motor in some cases. For example, in order to prevent overheating of a coil in the motor, a PTC (Positive Temperature Coefficient) thermistor is provided in the power supply line of the motor in some cases.

For example, Patent Literature 1 describes a structure of a DC motor in which a PTC thermistor is provided. In the motor described in Patent Literature 1, a structure in which a hole is opened in a bottom plate of the motor, and a PTC thermistor is arranged so as to pass through the hole is employed.

CITATION LIST

Patent Literature

Patent Literature 1: Japanese Patent Application Laid-open No. 2009-165209

SUMMARY

Technical Problem

The structure illustrated in Patent Literature 1 is complicated.

In the present disclosure, the above described is an example of a problem, and an object of the present disclosure is to provide a motor capable of arranging an electronic component in a power supply line of the motor.

Solution to Problem

A motor according to an embodiment includes a motor body comprising a bottom part and a motor terminal provided on the bottom part, and a terminal unit mounted on the bottom part of the motor body. The terminal unit includes a holder, an electronic component and a terminal part fixed to the holder, and a wiring part electrically connecting the motor terminal and the terminal part. The electronic component is provided on the wiring part. In the radial direction, the terminal part and the electronic component are arranged facing each other.

In accordance with one aspect of the present disclosure, a motor capable of arranging an electronic component in a power supply line of the motor can be provided.

DESCRIPTION OF EMBODIMENTS

Hereinafter, a motor using a terminal unit in the present embodiments of the present disclosure will be described.

In the following description, a direction in parallel with a rotary shaft of the motor is referred to as a rotary shaft direction in some cases. Moreover, the rotary shaft direction is referred to as an up-and-down direction in some cases (a direction where the rotary shaft protrudes when seen from a frame of the motor is an upper direction). The terms "up-and-down", "upper", "lower" and the like referred to here are indicating methods employed for convenience when only the motor is focused on and do not limit a direction in a device on which this motor is mounted or a posture this motor is used in any way.

First Embodiment

Figure 1:
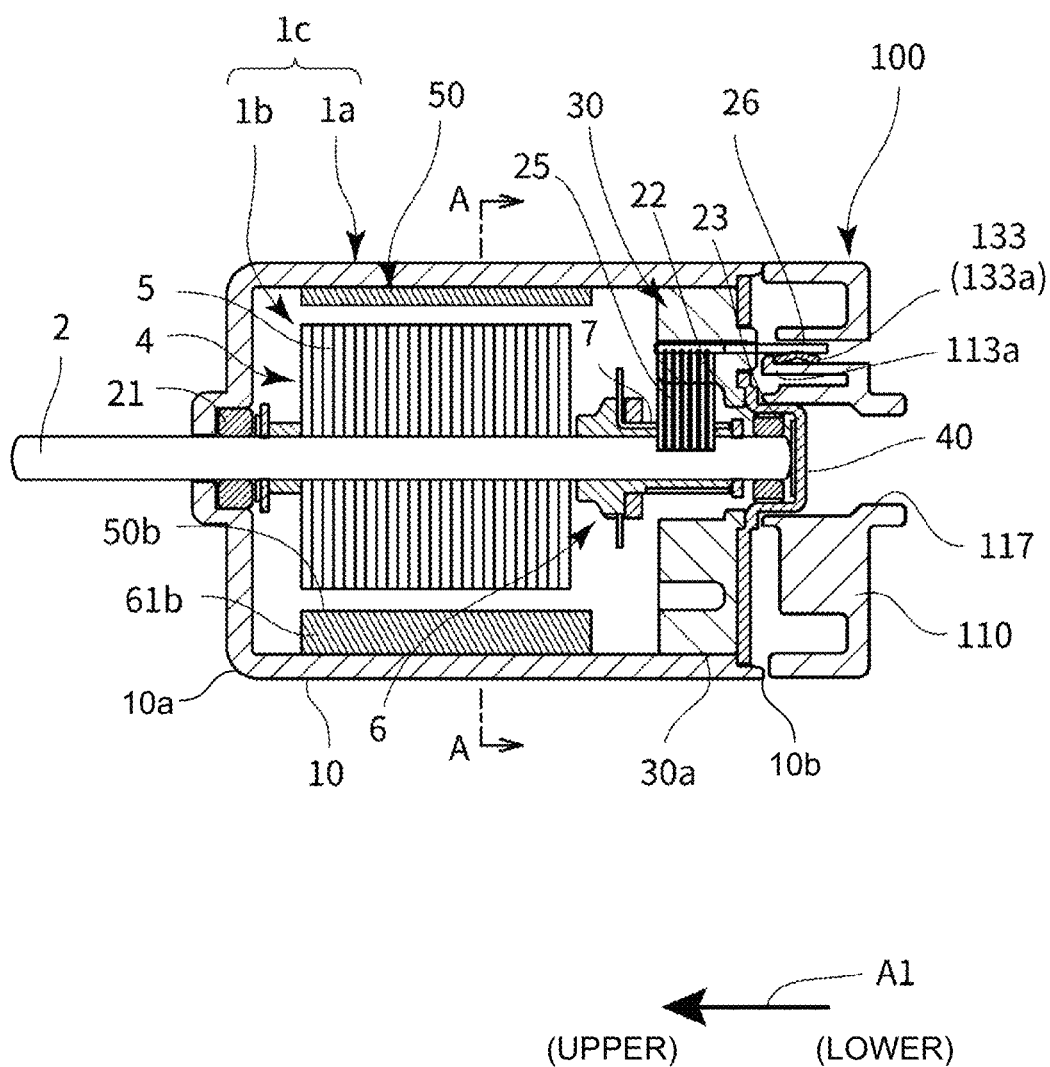
FIG. 1 is a sectional view illustrating a motor using a terminal unit in one of the embodiments of the present disclosure.

FIG. 1 is a sectional view illustrating the motor using the terminal unit in one of the first present embodiments of the present disclosure.

A section illustrated in FIG. 1 is a section illustrated as a B-B line in FIG. 2 which will be described later. In the following figures, an arrow A1 indicates the rotary shaft direction. In the arrow A1, a direction having an arrowhead is an upper side.

A motor 1 is a DC motor, for example. The motor 1 roughly includes a motor body 1c and a terminal unit 100. The motor body 1c includes a frame assembly 1a and a rotor rotatable with respect to the frame assembly 1a. The rotor is constituted by a rotary shaft (shaft) 2 and an armature assembly 1b. The terminal unit 100 is used by being connected with a bottom part (a portion on a lower side) of the motor body 1c, for example.

The armature assembly 1b is connected with the rotary shaft 2, and includes an armature portion 4, a commutator portion 6, and the like. The armature portion 4 includes an armature core 5 having salient poles protruding in plural in a radial direction, a wiring (not shown) wound around each of the salient poles, and the like. The commutator portion 6 is provided in the vicinity of one of the end portions of the rotary shaft 2. The commutator portion 6 includes a brush 25 provided at the frame assembly 1a, a commutator 7 in contact with the brush 25, and the like.

The frame assembly 1a is constituted by a frame 10, a bracket 30, a plate 40, a magnet 50, and the like. The plate 40 includes a surface 40a facing the bracket 30, and a surface 40b facing the terminal unit 100 (see FIG. 5).

The frame 10 includes an upper end portion 10a (one end portion, may be referred to as an outer peripheral end portion 10a) forming a lid part, and an lower end portion 10b (another end portion, may be referred to as an outer peripheral end portion 10b), and is formed in a tubular shape covered by the lid part including a surface. An opening portion of the end portion (an end portion at the right side in FIG. 1) on the lower side of the frame 10 is closed by the plate 40. In a housing constituted by the frame 10 and the plate 40, the armature assembly 1b is accommodated.

The bracket 30 is mounted on the inner side of the plate 40. The bracket 30 holds a motor terminal 26 to which an electric current from an outside is supplied. The motor terminal 26 is connected to the brush 25. The brush 25 is held so as to be in contact with the commutator 7.

The rotary shaft 2 penetrates through the lid part (a surface on the upper side) of the frame 10. That is, an upper end portion (one end portion) of the rotary shaft 2 protrudes from the inner side of the frame 10 to the outside, and the other parts of the rotary shaft 2 are accommodated in the frame 10. At a center part of the surface on the upper side of the frame 10, a bearing 21 is held. Moreover, at a center part of the plate 40, a bearing 22 is held. Below the bearing 22, a thrust washer 23 is arranged. The rotary shaft 2 is rotatably supported by the bearings 21 and 22 at two locations and by the thrust washer 23 with respect to the frame 10.

Figure 2:
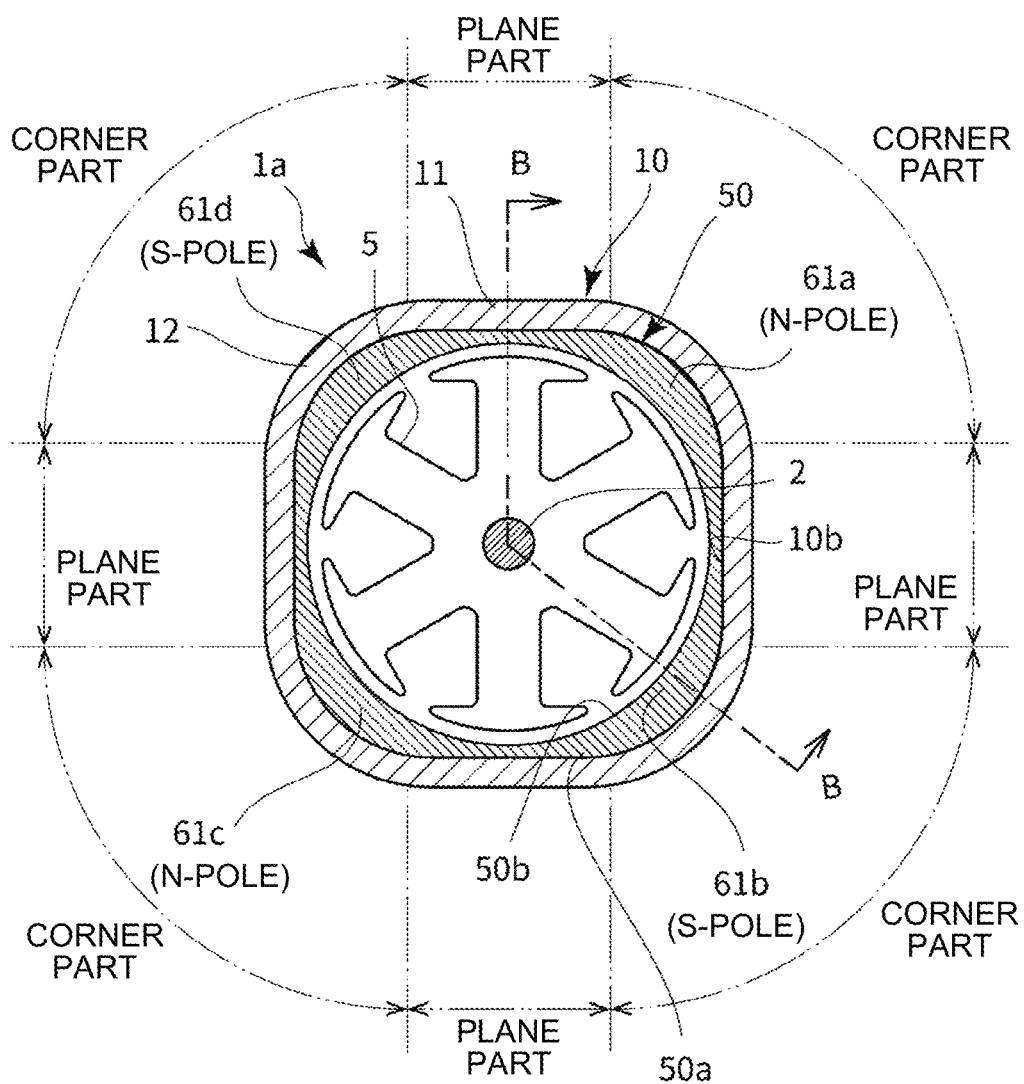
FIG. 2 is a sectional view on the A-A line in FIG. 1.

FIG. 2 is a sectional view on the A-A line in FIG. 1.

As illustrated in FIG. 2, in the present embodiment, one cylindrical magnet 50 is provided. The magnet 50 is arranged on the inner side of the frame 10. The frame assembly 1a has a sectional structure surrounding an outer peripheral surface 50a of the magnet 50 by the frame 10. The outer peripheral surface of the frame 10 becomes an outer peripheral surface of the motor body 1c. A plurality of magnets each having a magnetic pole element may be used.

The frame 10 is formed by using a magnetic body. The frame 10 has a plurality of corner parts 12 and surface parts (plane parts) 11 located between two adjacent corner parts 12. Specifically, the frame 10 has an outer shape having four plane parts 11 and corner parts 12, respectively. The two plane parts 11 adjacent in a circumferential direction are connected to each other through the one corner part 12. One of the two plane parts 11 adjacent in the circumferential direction is substantially perpendicular to another. The corner part 12 has a rounded shape (R-shape). The frame 10 is a substantially regular square on a section perpendicular to the rotary shaft 2. The frame 10 is formed having a square shape as the whole.

The frame 10 has a substantially uniform thickness. That is, an inner peripheral surface 10b of the frame 10 is constituted by a flat part of the plane part 11 and the rounded part of the corner part 12 connected in plural and is formed having a square shape.

The magnet 50 is a bonded magnet formed by using a known ferrite material or a rare earth material such as neodymium and samarium, and a known resin material, for example. The magnet 50 is not limited to the bonded magnet but may be a sintered type magnet, for example.

The magnet 50 has magnetic pole elements 61 (N-pole 61a, S-pole 61b, N-pole 61c, S-pole 61d). That is, the magnet 50 has the same number of magnetic pole elements 61 as the number of the corner parts 12 of the motor body 1c. The magnetic pole elements 61 are arranged in the circumferential direction so that the polarities alternate respectively. The four magnetic pole elements 61 are arranged at the four corner parts 12 of the frame 10 so that the magnetic pole elements 61 face each other. That is, switching parts of the four magnetic pole elements 61 are located at positions overlapping the plane parts 11 of the frame 10 in a radial direction, respectively.

The magnet 50 has an outer peripheral surface 50a rounded along an inner peripheral surface 10b of the frame 10 on the corner part 12. Moreover, the magnet 50 has an inner peripheral surface 50b having a columnar surface shape. A slight air gap is provided between the inner peripheral surface 50b of the magnet 50 and the armature core 5.

In the present embodiment, the magnet 50 is bonded to the inner peripheral surface 10b of the frame 10 by an adhesive (not shown). The magnet 50 is accommodated inside the frame 10 through the opening portion on the lower side of the frame 10 and is bonded to the inner peripheral surface 10b of the frame 10. After that, the armature assembly 1b is accommodated inside the frame 10, and by mounting the bracket 30 and the plate 40 on the frame 10, the motor body 1c is assembled.

Figure 3:
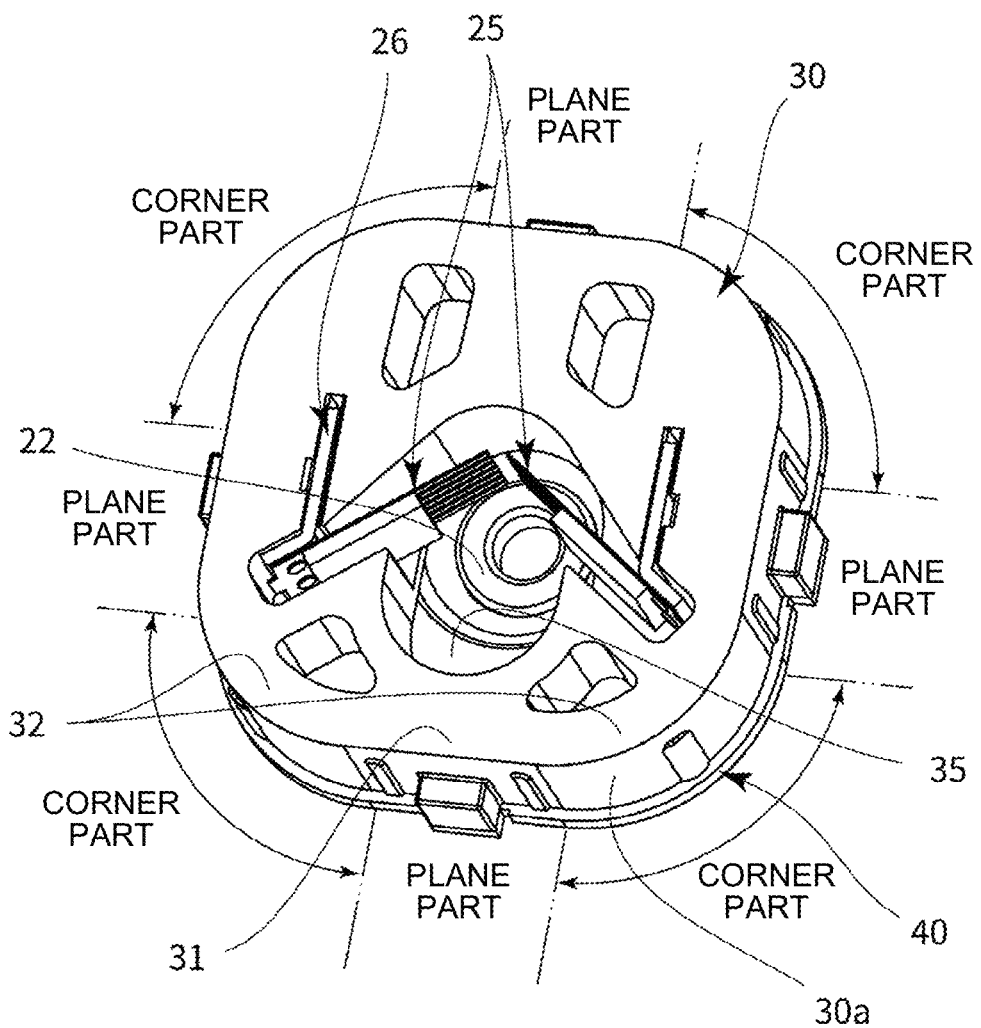
FIG. 3 is a perspective view illustrating a bracket and a plate.

FIG. 3 is a perspective view illustrating the bracket 30 and the plate 40.

In FIG. 3, parts on the upper sides of the bracket 30 and the plate 40 are illustrated. As illustrated in FIG. 3, the two motor terminals 26 are mounted on the bracket 30. One end portion of each of the brushes 25 is connected to the motor terminals 26. As a result, the two brushes 25 are supported by the motor terminals 26, respectively. Another end portion of each of the brushes 25 is in contact with the commutator 7 of the armature assembly 1b.

The bracket 30 is molded by a resin member, for example. The bracket 30 has a thickness in the rotary shaft direction. The bracket 30 has a cylinder part having an opening 35 through which the rotary shaft 2 passes. In the present embodiment, the bracket 30 is the cylinder part having the opening 35 at a center part. In the opening 35, the brush 25 is arranged. Moreover, the rotary shaft 2 penetrates through the opening 35. The bracket 30 has an outer peripheral surface 30a, an annular closed shape. That is, the cylinder part has the outer peripheral surface 30a.

When seen from the rotary shaft direction (on a plan view), the outer peripheral surface 30a of the cylinder part roughly has substantially the same shape as the inner peripheral surface 10b of the frame 10. That is, the bracket 30 has four corner parts 32 and plane parts 31 provided between the two adjacent corner parts 32. The outer peripheral surface 30a of the cylinder part is provided on the four corner parts 32 and the four plane parts. As illustrated in FIG. 1, in the rotary shaft direction, the outer peripheral surface 30a of the bracket 30 extends toward the magnet 50. A length of the bracket 30 in the rotary shaft direction is slightly larger than a dimension of the brush 25 in the rotary shaft direction, for example. The brush 25 is accommodated inside the opening 35. In a state in which the bracket 30 is mounted on the frame 10, the outer peripheral surface 30a of the bracket 30 is in contact with the inner peripheral surface 10b of the frame 10.

Figure 4:
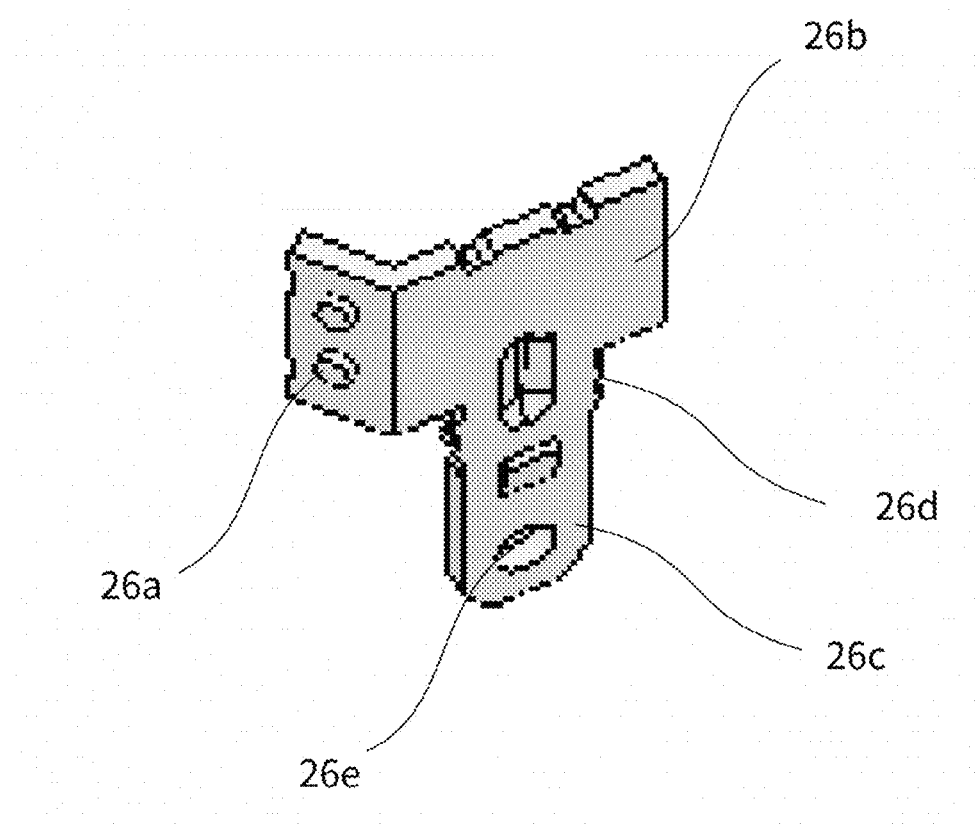
FIG. 4 is a perspective view illustrating a motor terminal.

FIG. 4 is a perspective view illustrating the motor terminal 26.

As illustrated in FIG. 4, the motor terminal 26 includes a brush fixing portion 26a fixing the brush 25, a holding portion 26b held by the bracket 30, and a terminal piece 26c extending downward from the holding portion 26b (extending in a direction intersecting with the extending direction of the holding portion 26b). The motor terminal 26 is made of a plate formed with metal. In a side edge of the terminal piece 26c, on a portion in the vicinity of the holding portion 26b, a projection 26d (hereinafter, referred to as a retaining projection) including a serrated shape protruding in a side direction is provided.

At the terminal piece 26c being a part of the motor terminal, a hole part 26e is formed. An engaged portion including an uneven shape may be provided instead of the hole part 26e.

Figure 5:
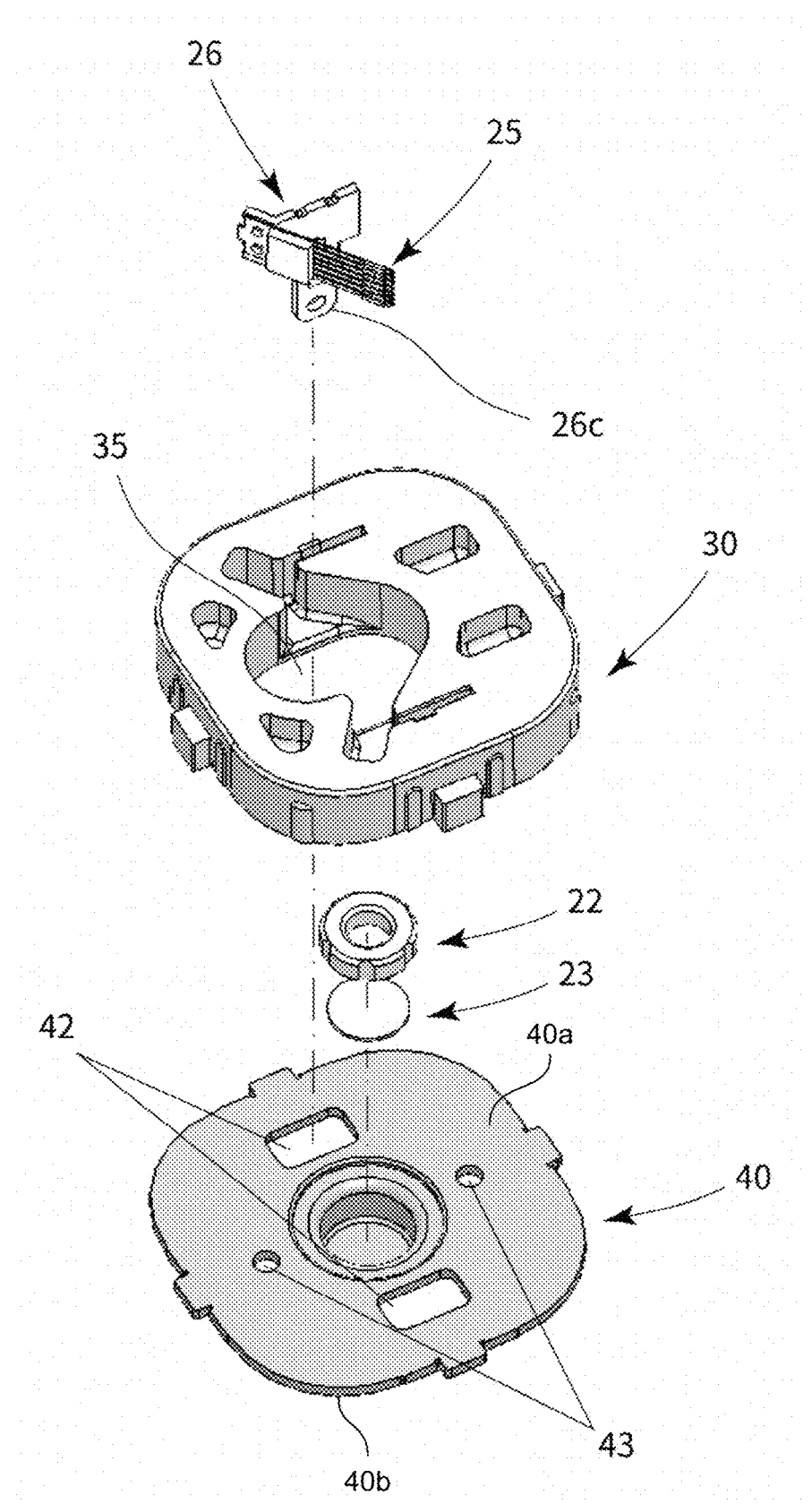
FIG. 5 is an exploded perspective view illustrating a structure including the bracket and the plate.

FIG. 5 is an exploded perspective view illustrating a structure including the bracket 30 and the plate 40.

In FIG. 5, an assembly of the brush 25 and the motor terminal 26 is illustrated only as one set. As illustrated in FIG. 5, by inserting the motor terminal 26 on which the brush 25 is mounted from above the bracket 30 to below, the holding portion 26b is held by the bracket 30. At this time, since the retaining projection 26d is hooked by a part of the bracket 30, the motor terminal 26 is prevented from being removed from the bracket 30.

The terminal piece 26c protrudes toward the plate 40 (downward) from the bracket 30. The terminal piece 26c penetrates through a terminal hole portion 42 formed in the plate 40 and protrudes below the plate 40. That is, the terminal piece 26c protrudes downward from the bottom part of the motor body 1c.

In the present embodiment, at the plate 40, a hole part 43 is provided in addition to the terminal hole portion 42. In the hole part 43, a projection portion (not shown) formed at the surface on the lower side of the bracket 30 is fitted. Moreover, in the hole part 43, a fastening member is fitted, as will be described later.

Figure 6:
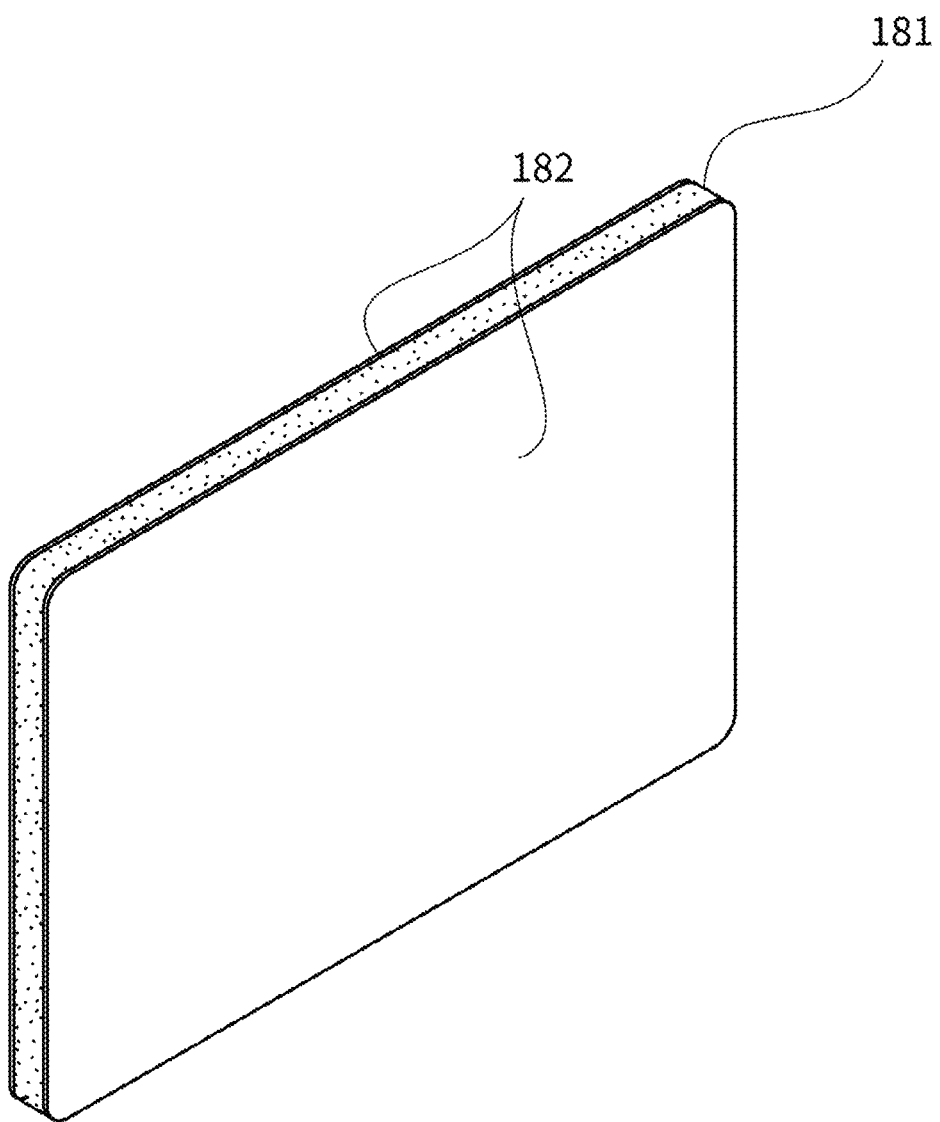
FIG. 6 is a perspective view illustrating a PTC thermistor.

FIG. 6 is a perspective view illustrating a PTC thermistor 180.

On the terminal unit 100, as an electronic component, the PTC thermistor 180 is mounted. As illustrated in FIG. 6, the PTC thermistor 180 is formed in a flat shape. The PTC thermistor 180 is a single plate type, for example. That is, the PTC thermistor 180 has two surfaces with areas larger than the other surfaces. In other words, the PTC thermistor 180 is formed in a parallelepiped shape including an upper surface and a lower surface with areas larger than the other side surfaces. The PTC thermistor 180 is constituted by sandwiching both surfaces (the upper surface and the lower surface) of a core 181 including a single plate shape by electrode plates 182, respectively. The electrode plates 182 form two surfaces of the PTC thermistor 180.

The PTC thermistor 180 may be a laminated plate shape in which plural layers of cores are laminated, for example.

Figure 7:
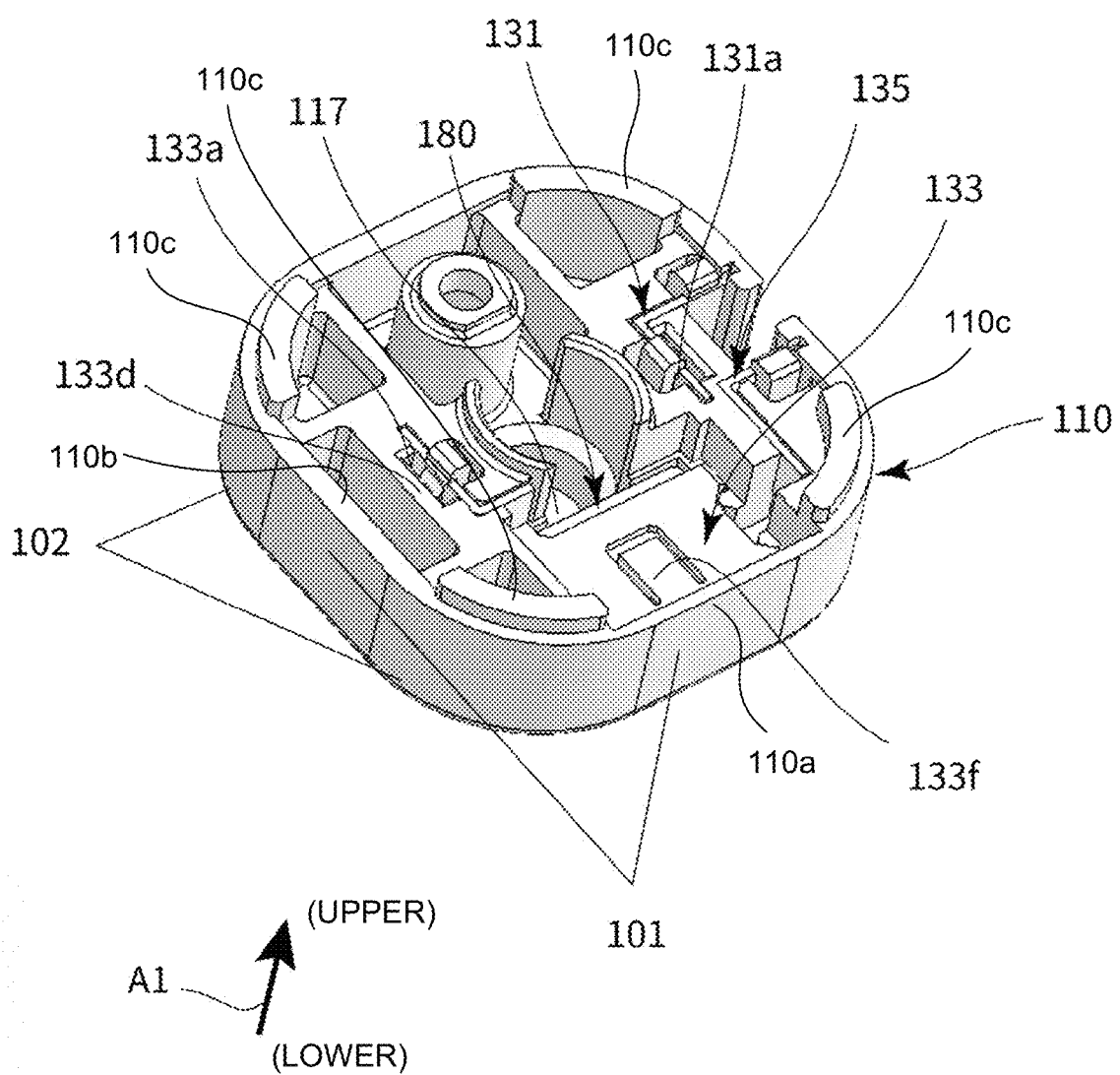
FIG. 7 is a perspective view illustrating a terminal unit.
Figure 8:
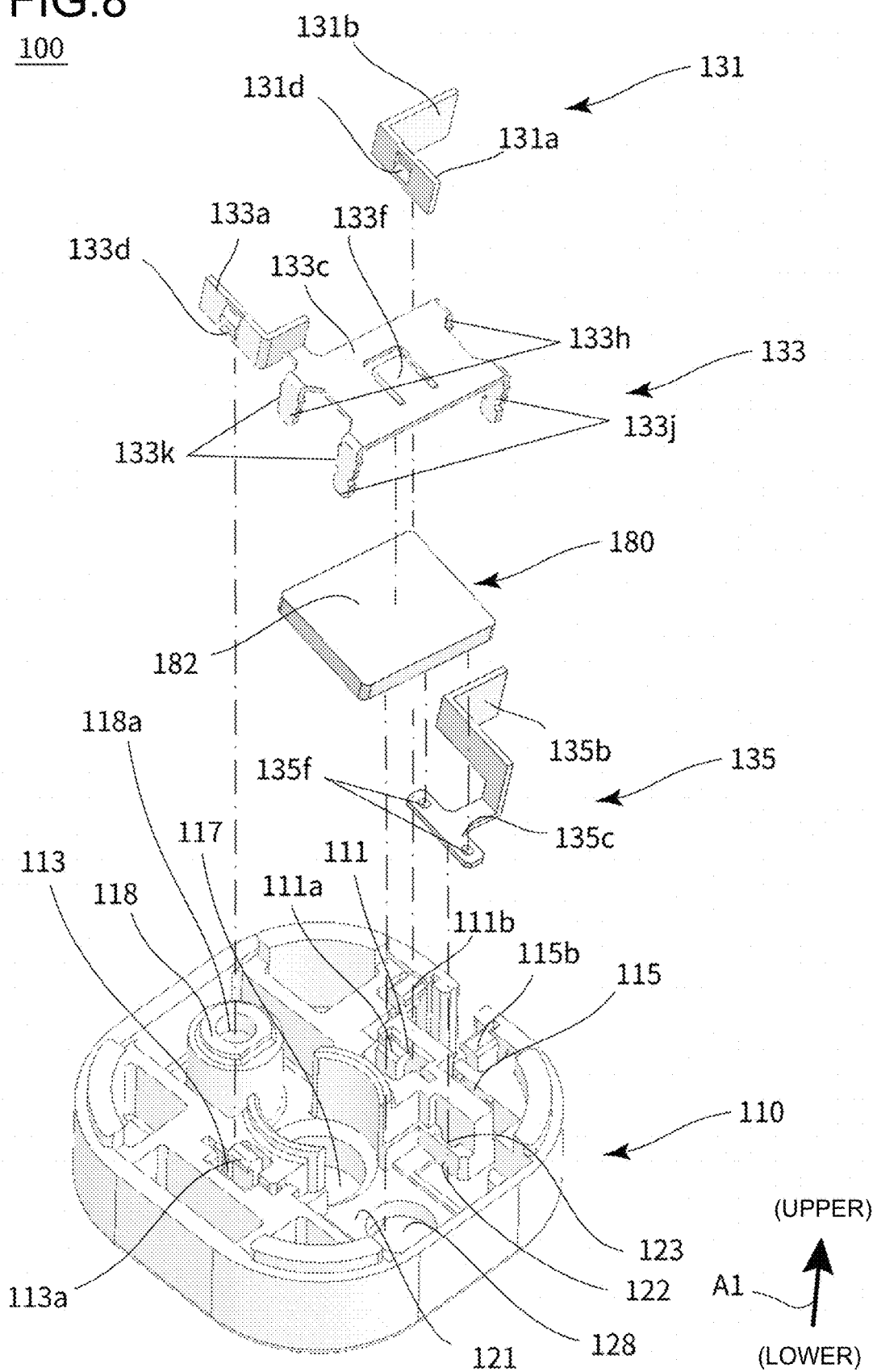
FIG. 8 is a first exploded perspective view illustrating the terminal unit.
Figure 9:
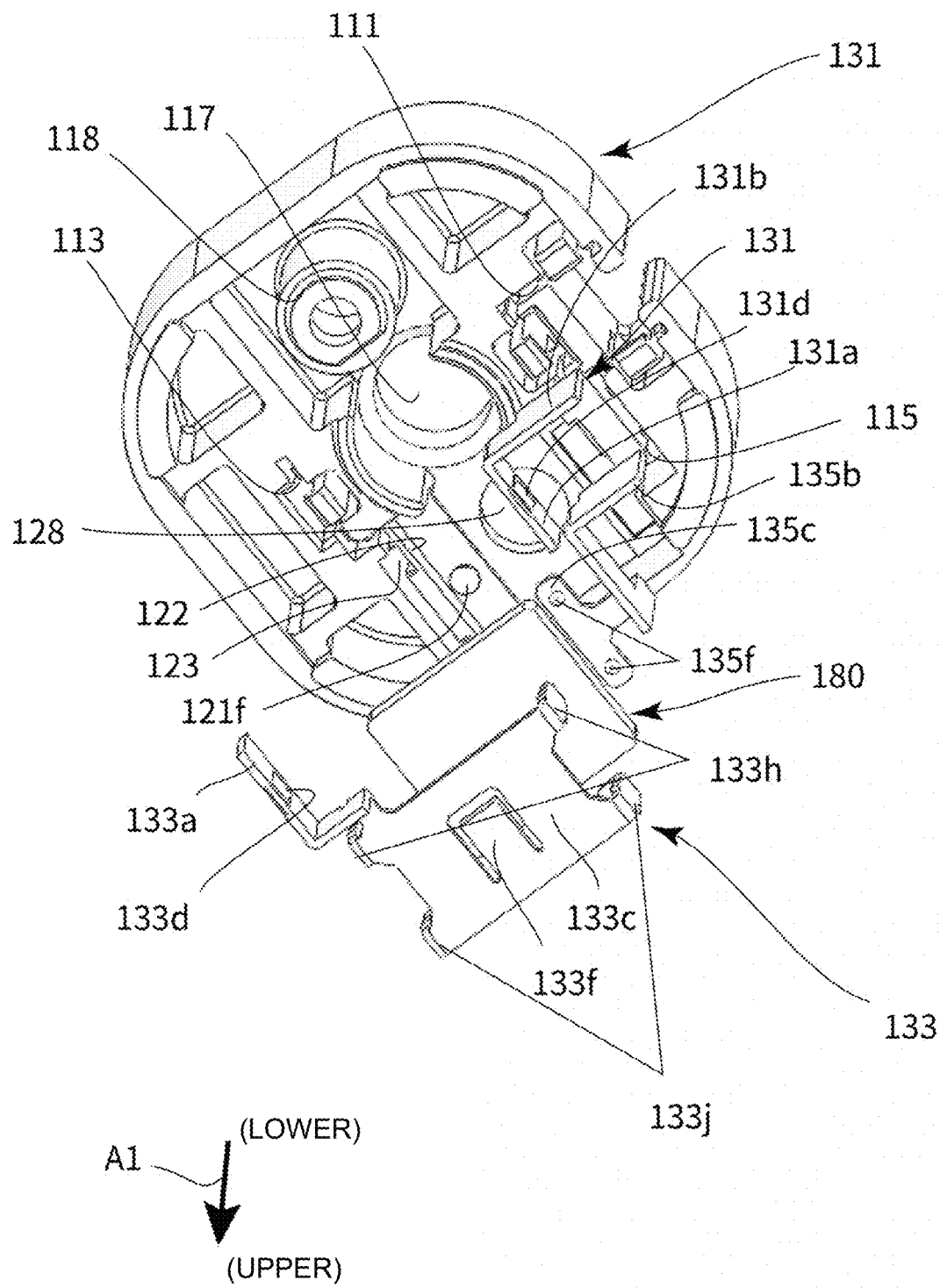
FIG. 9 is a second exploded perspective view illustrating the terminal unit.
Figure 10:
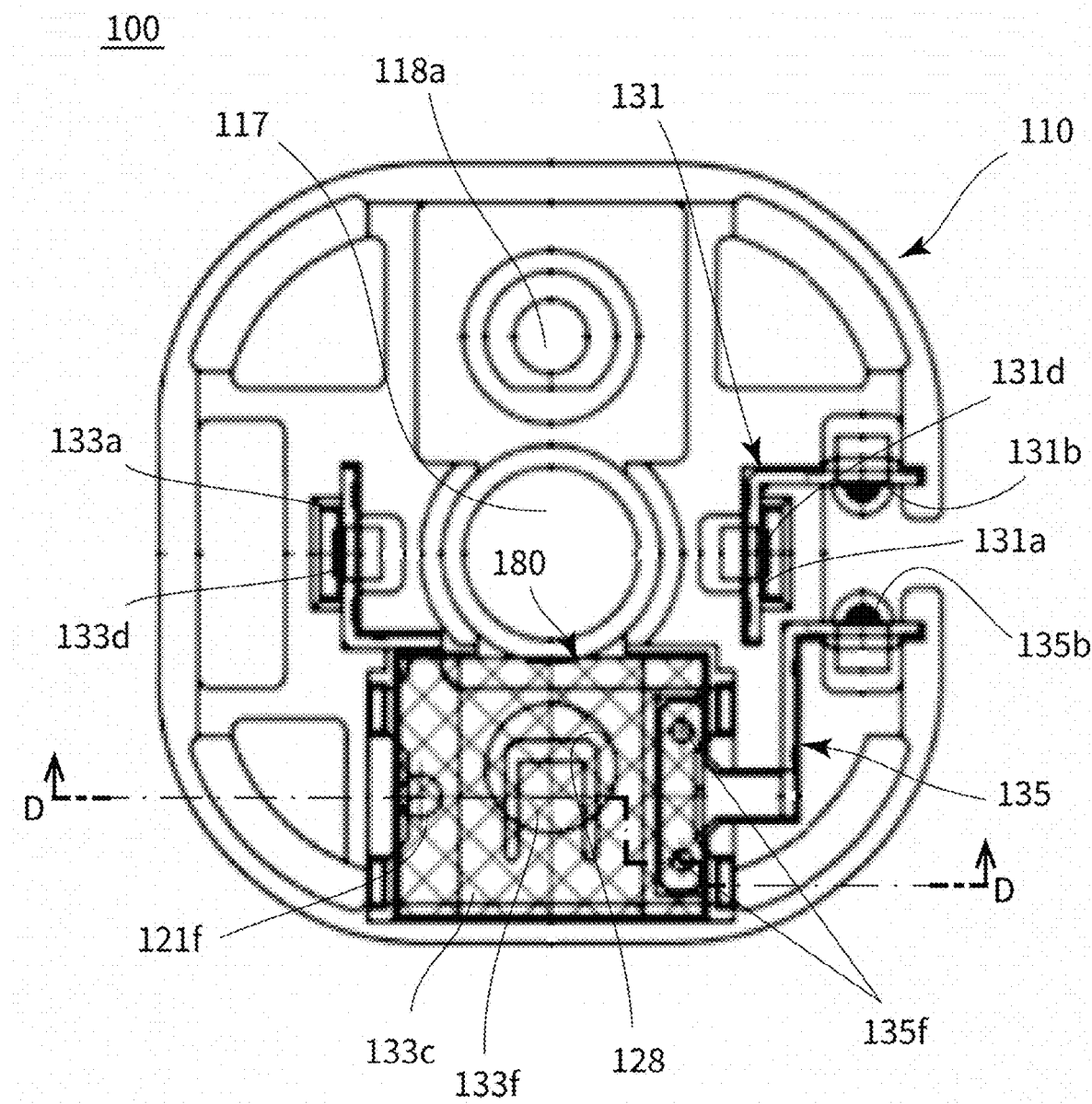
FIG. 10 is a top view illustrating the terminal unit.

FIG. 7 is a perspective view illustrating the terminal unit 100. FIG. 8 is a first exploded perspective view illustrating the terminal unit 100. FIG. 9 is a second exploded perspective view illustrating the terminal unit 100. FIG. 10 is a top view illustrating the terminal unit 100.

In FIGS. 7, 8, and 9, views of the terminal unit 100 seen from above are illustrated.

As illustrated in FIG. 7, the terminal unit 100 includes a holder 110, an upper-side terminal member 133, a lower-side terminal member 135, a third terminal member 131, and the PTC thermistor 180. The holder 110 includes an outer peripheral end portion 110a facing the outer peripheral end portion 10b of the frame 10 in a shaft direction of the motor 1. The outer peripheral end portion 110a of the holder 110 includes a surface 110b facing the outer peripheral end portion 10b of the frame 10 in the shaft direction of the motor 1, and a plurality of protrusion portions 110c protruding from the surface 110b toward the plate 40 being the bottom part of the motor body 1c in the shaft direction of the motor 1. These protrusion portions 110c face the plate 40 being the bottom part of the motor body 1c, and are in contact with the inner surface of the outer peripheral end portion 10b of the frame 10. By the protrusion portions 110c, the terminal unit 100 is positioned (guided) with respect to the frame 10.

The holder 110 is made of a resin, for example. On the holder 110, the upper-side terminal member 133, the lower-side terminal member 135, the third terminal member 131, and the PTC thermistor 180 are mounted.

An outer peripheral surface of the holder 110 has four corner parts 102 and plane parts 101 provided between two adjacent corner parts 102 similarly to the frame 10 of the motor body 1c, for example.

As illustrated in FIG. 8, on the holder 110, an opening portion (hereinafter, referred to as an upper-side insertion portion) 113 to which the upper-side terminal inserted, an opening portion (hereinafter, referred to as a lower-side insertion portion) 115 to which the lower-side terminal inserted, and an opening portion (hereinafter, referred to as a third terminal insertion portion) 111 to which the third terminal inserted are formed. The opening portions 113 and 115 (hereinafter, collectively referred to as an insertion portion) and the third terminal insertion portion 111 are formed, respectively. Each of the insertion portions 113, 115, and 111 is formed in a groove shape to which the corresponding terminal members 133, 135, and 131 are inserted from the upper side of the holder 110 (that is, the inner side of the holder 110). On the insertion portions 113, 115, and 111, claw portions 113a, 115b, 111a, and 111b each including a hook shape hooked to the upper edge of the inserted terminal members 133, 135, and 131 are formed, respectively. Since the claw portions 113a, 115b, 111a, and 111b are hooked to the upper edge of the terminal members 133, 135, and 131, the terminal members 133, 135, and 131 are prevented from being removed from the holder 110.

At a center part of the holder 110, a hole 117 is formed. The hole 117 is formed on an extension of the rotary shaft 2 of the motor body 1c. That is, the hole 117 is formed so that the center part of the plate 40 of the motor body 1c can be seen from below the motor 1. As a result, even if a process of applying a downward force to the rotary shaft of the motor body 1c is included in an assembling process of a device using the motor 1, for example, the center part of the plate 40 can be supported through the hole 117 easily.

Between the hole 117 and one of the plane parts 101, a recess portion (an example of a fixing portion) 118 extending upward from the lower surface of the holder 110 is provided. The recess portion 118 is formed so as to protrude upward when seen from the inner side of the holder 110. The upper end surface of the recess portion 118 is located at a position that may be in contact with the bottom surface of the plate 40 when the holder 110 is mounted on the motor body 1c. On the upper end surface of the recess portion 118, a hole part 118a is formed. In the plate 40, the hole part 43 is provided at a position facing the recess portion 118. Thus, the holder 110 and the plate 40 can be connected through the recess portion 118, using a fastening member such as a screw and a rivet-shaped member. As a result, the holder 110 and the motor body 1c can be connected.

The hole 117 or the recess portion 118 does not have to be provided. A coupling method between the holder 110 and the motor body 1c using the recess portion 118 does not have to be used. For example, as a method of mounting the holder 110 on the motor body 1c, only a method by engagement between the motor terminal 26 and the upper-side terminal member 133 and the third terminal member 131 as will be described later may be employed.

On the holder 110, an accommodating portion 121 in which the PTC thermistor 180 is accommodated is provided. The accommodating portion 121 is provided close to the one plane part 101, for example. The accommodating portion 121 is formed so that the PTC thermistor 180 having a substantially rectangular plate shape is arranged from above the holder 110 in a posture substantially perpendicular to the rotary shaft direction and with one side surface of the PTC thermistor 180 substantially in parallel with the one plane part 101 as will be described later.

In the vicinity of the accommodating portion 121, a wall 122 facing the side surface of the PTC thermistor 180 arranged in the accommodating portion 121 is formed. The wall 122 is formed of a resin member forming the holder 110. At a position farther away from the PTC thermistor 180 than the wall 122, hole parts 123 into which arm portions 133h and 133j of the upper-side terminal member 133 are inserted as will be described later are formed.

As illustrated in FIG. 9, a contact projection 121f protruding upward is formed on a bottom surface of the accommodating portion 121. The contact projection 121f is formed so as to face the lower surface of the PTC thermistor 180 arranged in the accommodating portion 121. The contact projection 121f is formed so as to be in contact with one spot on a portion closer to a side peripheral surface in the lower surface of the PTC thermistor 180 arranged in the accommodating portion 121.

On the bottom surface of the accommodating portion 121, an opening 128 vertically penetrating the holder 110 is provided. The opening 128 is formed so as to face the surface of the PTC thermistor 180 arranged in the accommodating portion 121. The outside of the holder 110 and the inside of the holder 110 are connected through the opening 128. Since the opening 128 is formed as described above, the temperature of outside air can be transferred easily to the PTC thermistor 180. Thus, the temperature of the PTC thermistor 180 can rise easily with respect to a temperature rise outside of the motor 1, and when the temperature rises outside the motor 1, an electric current can be controlled early by the PTC thermistor 180.

As illustrated in FIG. 8, the PTC thermistor 180 is arranged in the accommodating portion 121. In the present embodiment, the surfaces of the PTC thermistor 180 are directed toward the rotary shaft direction of the motor. That is, one of the two electrode plates 182 of the PTC thermistor 180 is directed upward and another is directed downward. In other words, the surfaces of the PTC thermistor 180 are perpendicular to the rotary shaft direction or have angles close to perpendicular to the rotary shaft direction. The PTC thermistor 180 is arranged in a posture not in parallel with the rotary shaft direction but inclined with respect to the rotary shaft direction.

The third terminal member 131 is a plate formed with metal molded by a press or the like. The third terminal member 131 has a band shape bent substantially at a right angle into an "L" shape. One end of the third terminal member 131 is a motor-side terminal piece 131a connected to the motor terminal 26. Another end of the third terminal member 131 is an external terminal surface 131b exposed to the outside of the holder 110.

On the motor-side terminal piece 131a, a projection portion as engaging means 131d is provided. The projection portion 131d is formed so that a part of the motor-side terminal piece 131a is pushed out in a direction perpendicular to the motor-side terminal piece 131a and is raised from the motor-side terminal piece 131a. The projection portion 131d is formed so as to protrude toward the motor terminal 26 connected to the motor-side terminal piece 131a as will be described later. The projection portion 131d protrudes in the direction substantially perpendicular to the rotary shaft direction.

The lower-side terminal member 135 is a plate formed with metal molded by a press or the like. The lower-side terminal member 135 has a shape in which a band-shaped plate formed with metal is bent substantially at a right angle at two locations. One end of the lower-side terminal member 135 is the external terminal surface 135b exposed to the outside of the holder 110. Another end of the lower-side terminal member 135 is an element-side terminal surface 135c extending toward the surface on the lower side of the PTC thermistor 180.

The element-side terminal surface 135c is located below the PTC thermistor 180. The element-side terminal surface 135c is located at a position away from the position where the contact projection 121f is formed. On the element-side terminal surface 135c, two contact projections 135f protruding upward, respectively, are formed. Each of the contact projections 135f is formed so as to face the lower surface of the PTC thermistor 180 arranged in the accommodating portion 121. Each of the contact projections 135f is formed so as to be in contact with one spot on a portion closer to the side peripheral surface in the lower surface of the PTC thermistor 180 arranged in the accommodating portion 121. That is, the element-side terminal surface 135c of the lower-side terminal member 135 is in contact with the electrode plate 182 on the lower side of the PTC thermistor 180. Each of the contact projections 135f is arranged at a position away from the contact projection 121f of the holder 110.

As illustrated in FIG. 10, the PTC thermistor 180 arranged in the accommodating portion 121 is in contact with three locations, that is, the one contact part (contact projection) 121f and the two contact parts (contact projections) 135f. A triangle connecting the three points with which the PTC thermistor 180 is in contact and the center part of the PTC thermistor 180 overlap when seen from the rotary shaft direction.

In the present embodiment, the external terminal surface 131b of the third terminal member 131 and the external terminal surface 135b of the lower-side terminal member 135 face each other in the vicinity of the plane part 101 different from the plane part 101 in the vicinity of the PTC thermistor 180. The external terminal surfaces 131b and 135b are exposed to the outside of the holder 110 and are capable of applying a voltage to the external terminal surfaces 131b and 135b and of feeding power to the motor 1 from external circuits and the like.

In the present embodiment, a lead wire is connected to each of the external terminal surfaces 131b and 135b (not shown). The lead wire is connected to the external terminal surfaces 131b and 135b by a method such as soldering or resistor welding, for example. By connecting the lead wire to a supply line of an external power supply, the motor 1 can be wired so that it is capable of being driven. The lower-side terminal member 135 and the third terminal member 131 may have a female-type terminal or a male-type terminal capable of connection with the external circuit instead of the external terminal surfaces 131b and 135b. The female-type terminal only needs to be constituted to be exposed to the outside of the holder 110 so as to be brought into contact with the male-type terminal inserted into the terminal unit 100 from the outside, for example. The male-type terminal only needs to be constituted to protrude from the holder 110 and be capable of connecting the female-type terminal provided in the external circuit, a lead wire and the like, for example.

The upper-side terminal member 133 is a plate formed with metal molded by a press or the like. The upper-side terminal member 133 has a plate-shaped plate portion 133c covering an upper surface of the PTC thermistor 180 and a band-shaped motor-side terminal piece 133a bent and extending from the plate portion 133c. The motor-side terminal piece 133a is connected to the motor terminal 26. The upper-side terminal member 133 is fixed to the holder 110.

On the motor-side terminal piece 133a, a projection portion 133d as the engaging means is provided. The projection portion 133d is formed so that a part of the motor-side terminal piece 133a is pushed out in the direction perpendicular to the motor-side terminal piece 133a and is raised from the motor-side terminal piece 133a. The projection portion 133d is formed so as to protrude toward the motor terminal 26 connected to the motor-side terminal piece 133a as will be described later. The projection portion 133d protrudes in the direction substantially perpendicular to the rotary shaft direction.

At a center part of the plate portion 133c, a pressing unit 133f is formed. The pressing unit 133f has a rectangular shape with one side connected to the plate portion 133c. That is, a gap is provided between three sides of a peripheral edge part of the pressing unit 133f and the plate portion 133c. The pressing unit 133f is a cantilever-shape supported by the plate portion 133c on the one side portion connected to the plate portion 133c. The pressing unit 133f is a tongue-shape supported by the plate portion 133c on the one side portion connected to the plate portion 133c. The pressing unit 133f can be deflected with respect to the plate portion 133c. That is, the upper-side terminal member 133 has flexibility.

The pressing unit 133f is bent slightly downward from the plate portion 133c. The pressing unit 133f is in contact with the surface of the PTC thermistor 180. That is, the pressing unit 133f is in contact with the electrode plate 182 on the upper side of the PTC thermistor 180. As a result, the upper-side terminal member 133 is electrically connected to the lower-side terminal member 135 through the PTC thermistor 180.

On the side edge part of the plate portion 133c, the two arm portions 133h and the two arm portions 133j bent from the plate portion 133c and extending downward are provided. The arm portion 133j is extended longer in a lower direction than the arm portion 133h. The four arm portions 133h and 133j are inserted into the four hole parts 123 adjacent to the accommodating portion 121 with the wall 122 between them. On a side edge of each of the arm portions 133h and 133j, a retaining projection 133k having a serrated shape protruding to the side is provided.

The upper-side terminal member 133 is fixed to the holder 110 by inserting the four arm portions 133h and 133j into the four hole parts 123 from above to below. At this time, the retaining projection 133k is hooked by a part of the holder 110, and the upper-side terminal member 133 is prevented from being removed from the holder 110.

Figure 11:
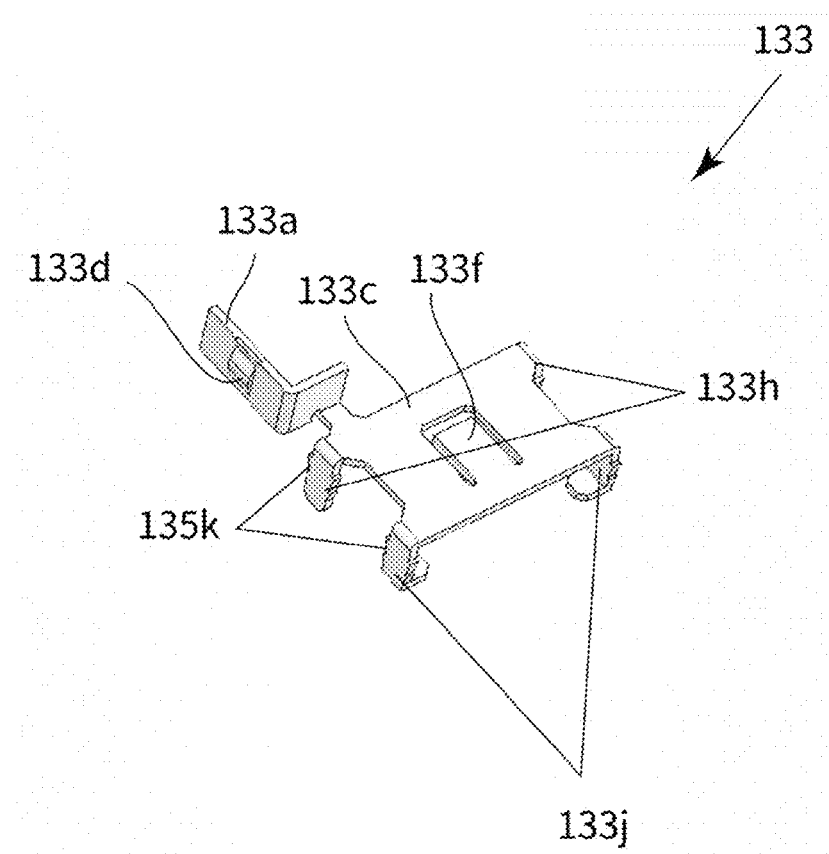
FIG. 11 is a perspective view illustrating an upper-side terminal member in a state fixed with a holder.

FIG. 11 is a perspective view illustrating the upper-side terminal member 133 in a state fixed to the holder 110.

In FIG. 11, only the upper-side terminal member 133 is illustrated. After the upper-side terminal member 133 is inserted into the holder 110, tip end portions of the two arm portions 133j are bent. That is, since the tip end portion of the arm portion 133j is bent, the arm portion 133j cannot be pulled out above from the hole part 123. As a result, the upper-side terminal member 133 is reliably held by the holder 110.

Figure 12:
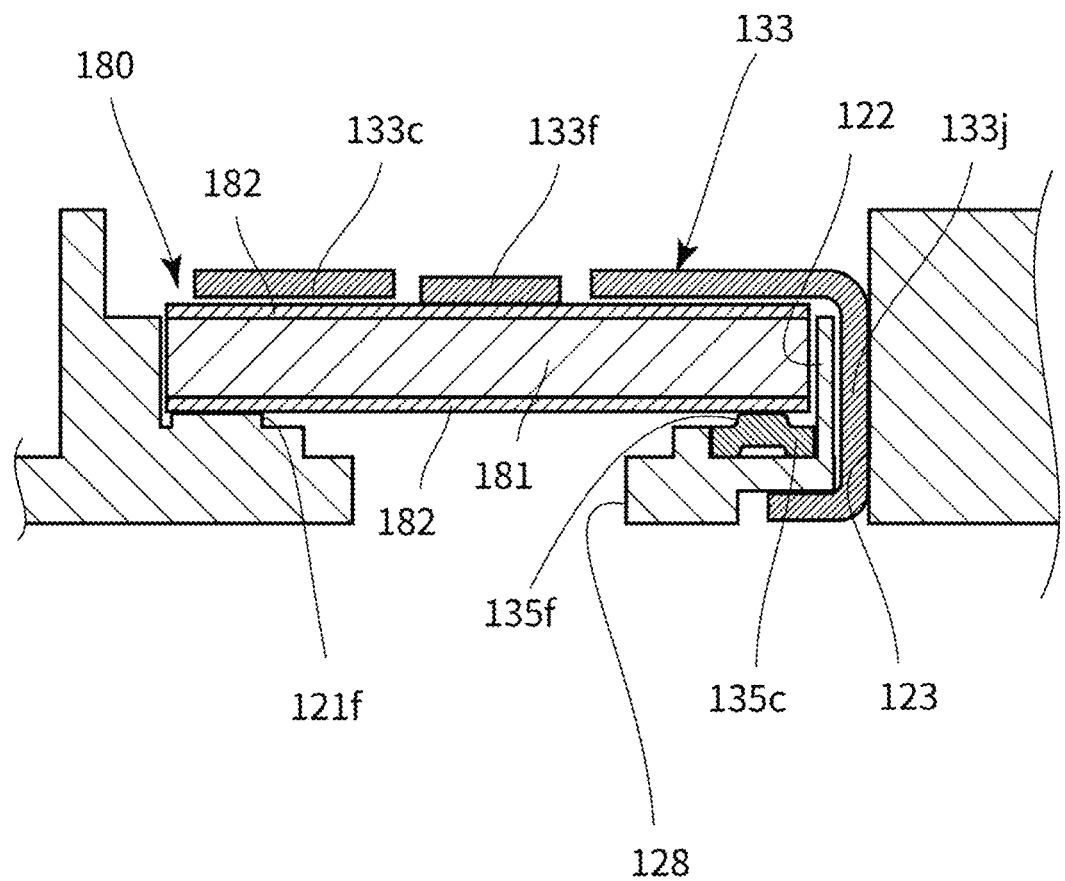
FIG. 12 is a sectional view on a D-D line in FIG. 10.
Figure 12:
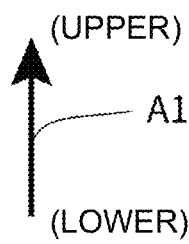

FIG. 12 is a sectional view on a D-D line in FIG. 10.

In a state where the upper-side terminal member 133 is fixed to the holder 110 as described above, as illustrated in FIG. 12, the pressing unit 133f is in contact with the surface of the PTC thermistor 180 and presses the PTC thermistor 180 onto the holder 110.

That is, in the state where the upper-side terminal member 133 is fixed to the holder 110, the pressing unit 133f is in contact with the center part of the electrode plate 182 on the upper side of the PTC thermistor 180. Moreover, the PTC thermistor 180 is supported from the lower side at three points in the vicinity of the side edge of the electrode plate 182 on the lower side by the one contact projection 121f and the two contact projections 135f. In this state, the pressing unit 133f is pushed up by the PTC thermistor 180 to an upper side more than in a natural state (a state where no force is applied to the upper-side terminal member 133) and is deflected. Thus, the PTC thermistor 180 is pressed toward the contact projections 121f and 135f by a restoring force of the pressing unit 133f. In other words, the lower-side terminal member 135 is in contact with the other of the electrode plates 182 since the PTC thermistor 180 is pressed by the pressing unit 133f onto the holder 110. As described above, the state where the PTC thermistor 180 reliably contacts the upper-side terminal member 133 and the lower-side terminal member 135 is maintained.

Here, as illustrated in FIG. 12, the arm portions 133h and 133j of the upper-side terminal member 133 inserted into the hole parts 123 and the side surface of the PTC thermistor 180 face each other across the wall 122. Since the wall 122 is provided, the arm portions 133h and 133j and the PTC thermistor 180 are not brought into contact and thus, a state where the PTC thermistor 180 reliably functions in a power feeding path of the motor 1 is maintained.

When terminals other than the upper-side terminal member 133 such as the lower-side terminal member 135 or the third terminal member 131 are arranged so as to pass the vicinity of the PTC thermistor 180, too, the terminal and the PTC thermistor 180 are prevented from being brought into contact unintentionally by providing a wall such as the wall 122 between the PTC thermistor 180 and the terminal.

On a part of the terminal unit 100 facing the bottom part of the motor body 1c, an engaging portion engaged with a part of the bottom part is provided. The terminal unit 100 is fixed to the bottom part of the motor body 1c by the engaging portion engaged with the engaged portion provided on the bottom part side of the motor body 1c.

Specifically, on the terminal piece 26c of the motor terminal 26, for example, a hole part 26e is provided. The terminal piece 26c protrudes downward from the plate 40 being the bottom part of the motor body 1c. The hole part 26e becomes the engaged portion. The two terminal pieces 26c protrude downward from the motor body 1c. On an upper surface side of the terminal unit 100, the motor-side terminal piece 133a of the upper-side terminal member 133 and the motor-side terminal piece 131a of the third terminal member 131 are exposed so as to correspond to each of the terminal pieces 26c, respectively. On each of the motor-side terminal pieces 131a and 133a, the projection portions 131d and 133d that become the engaging portions are formed.

In the terminal unit 100, on the sides to which the projection portions 131d and 133d protrude, of the motor-side terminal pieces 131a and 133a at the two locations, insertion spaces for the terminals are provided. By inserting the two terminal pieces 26c into the insertion spaces, the projection portions 131d and 133d are in contact with the surfaces of the terminal pieces 26c, and at least one of the motor-side terminal pieces 131a and 133a and the terminal pieces 26c is slightly deflected. When the projection portions 131d and 133d and the hole parts 26e of the terminal pieces 26c are overlapped in a direction perpendicular to the rotary shaft direction, the projection portions 131d and 133d are fitted into the hole parts 26e, and both are engaged with each other. In this manner, when the terminal pieces 26c on the motor body 1c side and the motor-side terminal pieces 131a and 133a on the terminal unit 100 side are engaged with each other, the terminal unit 100 is fixed to the motor body 1c. A recess-shaped engaged portion may be provided instead of the hole part 26e. That is, the terminal unit 100 includes the motor-side terminal piece 131a and the motor-side terminal piece 133a each serving as a motor terminal connection portion electrically connected to the motor terminal 26. When one of the motor terminals 26 and the motor-side terminal piece 131a are fitted to each other, and when the other motor terminal 26 and the motor-side terminal piece 133a are fitted to each other, the motor body 1c and the terminal unit 100 are connected. Specifically, a part of the surface of the motor-side terminal piece 131a facing one of the motor terminals 26, and a part of the surface of the motor-side terminal piece 133a facing the other motor terminal 26 protrude. For example, on the motor-side terminal piece 131a, as an engaging means, the projection portion 131d is provided, and on the motor-side terminal piece 133a, as an engaging means, the projection portion 133d is provided. On the surface of the motor terminal 26 facing a part (for example, projection portion 131d or projection portion 133d) of the surface of the motor terminal connection portion (motor-side terminal piece 131a or motor-side terminal piece 133a), as an engaged portion, the hole part 26e is provided. As described above, on the motor terminal 26, as an engaged portion, a recess portion may be provided. Moreover, the location where the motor body 1c and the terminal unit 100 are fitted to each other may only be a fitting part between the motor terminal 26 and the motor terminal connection portion (motor-side terminal piece 131a or motor-side terminal piece 133a).

Moreover, the plate 40 being the bottom part of the motor body 1c and the holder 110 are mutually separable. Specifically, in the shaft direction of the motor 1, the surface 40b of the plate 40 being the bottom part of the motor body 1c and the surface 110b of the holder 110 facing each other are mutually separable. Moreover, the motor body 1c has the frame 10, and the frame 10 and the holder 110 are mutually separable. Specifically, in the shaft direction of the motor 1, the outer peripheral end portion 10b of the frame 10 and the outer peripheral end portion 110a of the holder 110 facing each other are mutually separable. In this manner, by constituting the bottom part of the motor body 1c and the holder 110, or the frame 10 and the holder 110 mutually separable, the terminal unit can be freely modified according to the application of the motor and the like. Alternatively, the vibration of the motor can be prevented from being transmitted to the terminal unit.

In this manner, in a state in which the motor body 1c and the terminal unit 100 are connected, in the terminal unit 100, wiring parts for electrically connecting the motor terminals 26 and the external terminal surfaces 131b and 135b are accommodated. That is, a wiring part of a first system for electrically connecting one of the motor terminals 26 and the external terminal surface 131b is constituted by the third terminal member 131. Moreover, a wiring part of a second system for electrically connecting the other motor terminal 26 and the external terminal surface 135b is constituted by the upper-side terminal member 133, the PTC thermistor 180, and the lower-side terminal member 135. The PTC thermistor 180 is provided in the middle of the wiring part of the second system.

Forms of the engaging portion and the engaged portion with which it is engaged are not limited to the above. The motor body 1c side may have a female-type terminal as the engaged portion, instead of the male-type terminal as in the present embodiment, and a male-type terminal piece as the engaging means protruding upward and engaged with the female-type terminal of the motor body 1c may be provided in the terminal unit 100. A projection-shaped engaged portion may be formed on a terminal piece on the motor body 1c side, and a hole-shaped or a recess-shaped engaging portion may be formed on the terminal piece on the terminal unit 100 side. Moreover, the engaged portion on the motor body 1c side is not limited to the terminal piece 26c but need only be provided at an appropriate portion such as a part of the plate 40 of the motor body 1c or a part of the frame 10, a part of the bracket 30 and the like. Similarly, the engaging portion on the terminal unit 100 side is not limited to the motor-side terminal pieces 131a and 133a but only needs to be provided at an appropriate portion such as a part of the holder 110 or a member mounted on the holder 110 and the like.

Conventionally, in such a small-sized motor, ensuring a space for providing a circuit element such as a PTC thermistor or the like has been difficult in some cases. If the plate-shaped PTC thermistor is to be arranged in the small-sized small-diameter motor, for example, the PTC thermistor is arranged substantially in parallel with the rotary shaft in general. However, if a length of the motor in the rotary shaft direction is limited, it has been difficult to arrange the PTC thermistor substantially in parallel with the rotary shaft as above.

On the other hand, in the present embodiment, the PTC thermistor 180 can be arranged in the posture substantially perpendicular to the rotary shaft direction. Thus, a dimension of the motor 1 in the rotary shaft direction can be made shorter.

The upper surface of the PTC thermistor 180 faces the plate 40 to become the bottom surface of a housing of the motor body 1c. That is, since the PTC thermistor 180 is arranged so that an area capable of sensing a heat of the motor body 1c is made larger, detection accuracy of the PTC thermistor 180 is improved.

Moreover, the PTC thermistor 180 is accommodated in the terminal unit 100 that can be externally attached to the motor body 1c functioning as a motor even as a single body. In a conventionally known structure, a hole through which a PTC thermistor penetrates is provided at the bottom plate of the motor in some cases. However, in such a structure, a measure against EMC (electromagnetic compatibility) noise becomes insufficient. For example, a switching noise of a commutator/brush is likely to emanate from the motor as a radiation noise through the hole in the bottom plate. On the other hand, in the present embodiment, there is no need to provide a hole at the housing of the motor through which the PTC thermistor penetrates. Therefore, the motor 1 built-in with the PTC thermistor 180 can be manufactured, without degrading the EMC performance of the motor body 1c.

Moreover, after the motor body 1c and the terminal unit 100 are manufactured, respectively, by assembling the motor body 1c and the terminal unit 100, the motor 1 can be manufactured. Thus, a manufacturing line for manufacturing the motor body 1c not having the PTC thermistor 180 and a manufacturing line with the terminal unit 100 can be made separate. Efficient manufacture in the same manufacturing line can be realized regardless of a difference on whether the motor body 1c is used as a motor as a single body or is used as the motor 1 with the PTC thermistor 180.

The terminal unit 100 is fixed to the motor body 1c by being engaged with the bottom part of the motor body 1c. Therefore, by mounting the terminal unit 100 having the same constitution on the various types of motor bodies 1c with different wirings or lengths of the rotary shafts and the like having the bottom part constituted in the same form, the motors 1 with the PTC thermistors 180 with different specifications such as wirings, rotary shafts and the like can be manufactured, respectively. Therefore, separate manufacturing lines for each motor with fine specification differences do not have to be prepared, and the terminal unit 100 used for various types of motor bodies can be manufactured by the same manufacturing line and thus, the motor 1 can be manufactured efficiently.

The PTC thermistor 180 is incorporated in a power source supply line of the motor 1 without using soldering or the like. Therefore, the manufacture of the motor 1 can be carried out easily, and nonconformities caused by defective connection of a solder or the like can be prevented.

In the manufacture of the terminal unit 100, there is no process such that, while the upper-side terminal member 133 or the lower-side terminal member 135 is in contact with the electrode plate 182 of the PTC thermistor 180, both are relatively moved by sliding one of them with respect to another or the like. Therefore, since the electrode plate 182 is not scratched by the upper-side terminal member 133 or the lower-side terminal member 135, and the PTC thermistor 180 is not damaged in the manufacture of the terminal unit 100, the terminal unit 100 can be manufactured easily.

The center part on the upper surface of the PTC thermistor 180 is pressed downward by the pressing unit 133f. Moreover, the lower surface of the PTC thermistor 180 is supported by the contact projection 121f in one side edge vicinity part and is supported by the contact projection 135f in a side edge vicinity part on an opposite side with the center part between them in the direction perpendicular to the rotary shaft direction. That is, the PTC thermistor 180 is held by the holder 110 in a state receiving a load on the center part of a both-end supported beam, and a state in contact with the contact projection 135f of the lower-side terminal member 135 is reliably maintained.

As the PTC thermistor 180, a plate type can be used. Since the inexpensive PTC thermistor 180 can be used, as compared with a case where a PTC thermistor of a surface mount type is used, manufacturing cost of the motor 1 can be reduced. Moreover, since the plate-type PTC thermistor 180 can be used, the PTC thermistor 180 with an appropriate shape according to the shape of the terminal unit 100 or an application of the motor 1 can be used. Therefore, the components in the terminal unit 100 can be more freely arranged.

Second Embodiment

Because the basic structure of the motor 1 in the second embodiment is the same as in the first embodiment, the explanation will not be repeated here. The structure of the motor body 1c is the same as in the first embodiment. The second embodiment is different from the first embodiment in using a terminal unit 200 with a different layout of the terminal or the like from the terminal unit 100 described above.

Figure 13:
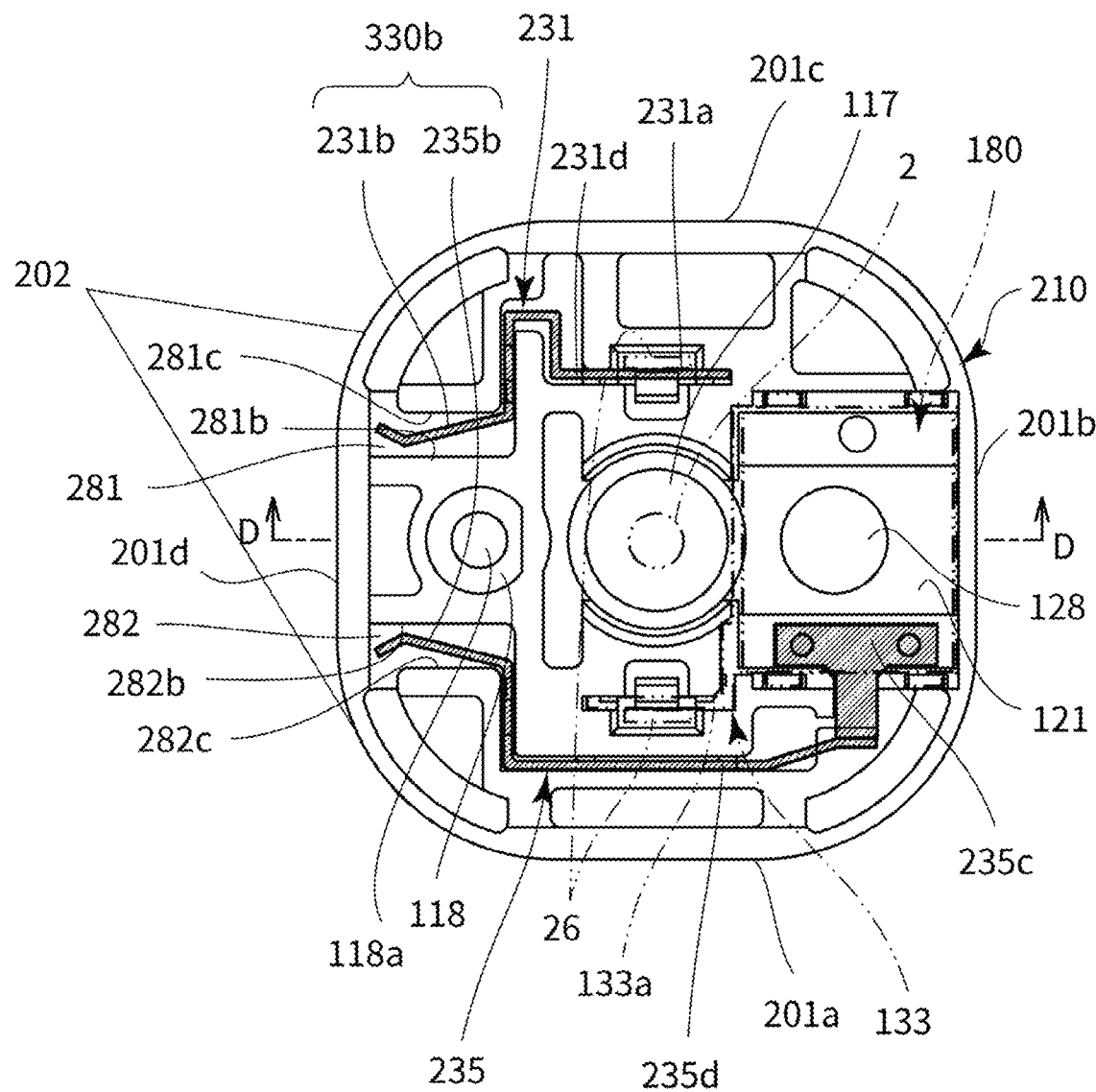
FIG. 13 is a top view illustrating a terminal unit of a motor according to a second embodiment.
Figure 14:
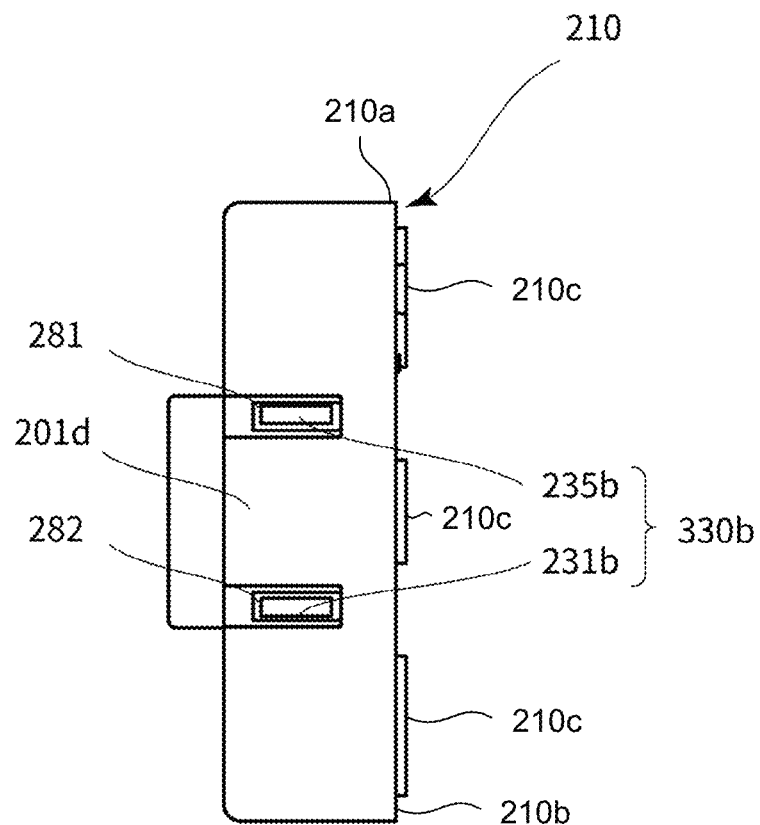
FIG. 14 is a side view illustrating the terminal unit.

FIG. 13 is a top view illustrating the terminal unit 200 of the motor 1 according to the second embodiment. FIG. 14 is a side view illustrating the terminal unit 200.

In FIG. 13, hatching is applied to a first terminal member 231 and a second terminal member 235. The upper-side terminal member 133, the PTC thermistor 180, and the motor terminal 26 on the motor body 1c side are indicated by two-dot chain lines. The X direction illustrated in FIG. 13 is a direction perpendicular to a pair of plane parts 201b and 201d, and the Y direction is a direction perpendicular to a pair of plane parts 201a and 201c, in other words, a direction perpendicular to the X direction.

In the second embodiment, the terminal unit 200 includes a holder 210, the PTC thermistor 180 and a terminal part 330b both fixed to the holder 210, and a wiring part electrically connecting the motor terminal 26 of the motor body 1c and the terminal part 330b. The terminal part 330b includes two terminals 231b and 235b (first terminal 231b and second terminal 235b) including a contact surface in contact with an external terminal 380. There are two systems in the wiring part including a wiring part of a first system for electrically connecting the first terminal 231b and one of the motor terminals 26, and a wiring part of a second system for electrically connecting the second terminal 235b and the other motor terminal 26. The wiring parts of the first system and second system each include a wiring formed of a metal member.

On the terminal unit 200, the first terminal member 231, the upper-side terminal member 133, and the second terminal member 235 are provided. The upper-side terminal member 133 is formed substantially the same as in the first embodiment. In the second embodiment, the first terminal member 231 and the second terminal member 235 are used instead of the third terminal member 131 and the lower-side terminal member 135 in the first embodiment.

The wiring part of the first system is constituted by the first terminal member 231. The wiring part of the second system is constituted by the upper-side terminal member 133, the PTC thermistor 180, and the second terminal member 235. That is, the PTC thermistor 180 is provided in the middle of the second wiring part.

In the second embodiment, as illustrated in FIG. 13, on the holder 210, the first terminal member 231, the upper-side terminal member 133, the second terminal member 235, and the PTC thermistor 180 are mounted. The holder 210 is made of a resin, for example.

Similar to the frame 10 of the motor body 1c, for example, the outer peripheral surface of the holder 210 has four corner parts 202, and four plane parts 201 (a plane part 201a, a plane part 201b, a plane part 201c, and a plane part 201d in a counterclockwise direction, from the surface on the lower side in FIG. 13) provided between the two adjacent corner parts 202.

On the holder 210, a groove shape to which the terminal members 231, 133, and 235 inserted is formed. Moreover, a claw portion for fixing the terminal members 231 and 133 to the holder 210 is formed. The positions of the parts differ according to the positions of the terminal members 231, 133, and 235, but the function and the shape are the same as in the first embodiment.

In the second embodiment also, at the holder 210, the accommodating portion 121 accommodating the PTC thermistor 180 is provided. The accommodating portion 121 is provided at a position in the vicinity of the one plane part 201b. The shape of the accommodating portion 121, and the accommodating structure of the PTC thermistor 180 electrically connected to the two terminal members 133 and 235 are the same as in the first embodiment.

In the second embodiment, the terminal part 330b is arranged at a position in the vicinity of one plane part 201d. That is, in the radial direction, the terminal part 330b and the PTC thermistor 180 are arranged facing each other. In other words, the terminal part 330b and the PTC thermistor 180 are arranged at positions facing the rotary shaft 2 (illustrated in the two-dot chain line in FIG. 13). The PTC thermistor 180 is located near one of the two plane parts 201b and 201d facing each other with the rotary shaft 2 between the plane parts 201b and 201d, and the terminal part 330b is located near the other.

The first terminal member 231 is a plate formed with metal molded by a press or the like. One of the end portions (hereinafter, referred to as a tip end portion) of the first terminal member 231 is the first terminal 231b of the terminal part 330b. The other end portion (hereinafter, referred to as a tip end portion) of the first terminal member 231 is a motor-side terminal piece 231a connected to the motor terminal 26. A specific shape of the motor-side terminal piece 231a is substantially the same as the motor-side terminal piece 131a of the third terminal member 131 in the first embodiment. In the first terminal member 231, wiring 231d is provided between the first terminal 231b and the motor-side terminal piece 231a. By the wiring 231d and the motor-side terminal piece 231a, the first terminal 231b and the motor terminal 26 engaged with the motor-side terminal piece 231a are electrically connected.

The second terminal member 235 is a plate formed with metal molded by a press or the like. One of the end portions (hereinafter, referred to a tip end portion) of the second terminal member 235 is the second terminal 235b of the terminal part 330b. The other end portion (hereinafter, referred to as a tip end portion) of the second terminal member 235 is an element-side terminal surface 235c extending toward the surface on the lower side of the PTC thermistor 180. A specific shape of the element-side terminal surface 235c is substantially the same as the element-side terminal surface 135c. In the second terminal member 235, wiring 235d is provided between the second terminal 235b and the element-side terminal surface 235c. By the wiring 235d and the element-side terminal surface 235c, the second terminal 235b and the PTC thermistor 180 in contact with the element-side terminal surface 235c are electrically connected. That is, the second terminal 235b are electrically connected through the PTC thermistor 180 to the motor terminal 26 engaged with the motor-side terminal piece 133a of the upper-side terminal member 133. In the second embodiment, the terminal unit 200 includes the motor-side terminal piece 231a of the first terminal member 231 and the motor-side terminal piece 133a of the upper-side terminal member 133 described in the first embodiment, each serving as a motor terminal connection portion electrically connected to the motor terminal 26. In the second embodiment, when one of the motor terminals 26 and the motor-side terminal piece 231a are fitted to each other, and when the other motor terminal 26 and the motor-side terminal piece 133a are fitted to each other, the motor body 1c and the terminal unit 200 are connected.

The first terminal member 231 and the second terminal member 235 may not be integrally formed by molding a plate formed with metal. For example, instead of using the wirings 231d and 235d, a conductive wire may be used to connect the first terminal 231b and the motor-side terminal piece 231a, or to connect the second terminal 235b and the element-side terminal surface 235c.

The first terminal 231b and the second terminal 235b are formed so as the longitudinal direction becomes the X direction, respectively. That is, as illustrated in FIG. 13, when seen from above, a direction from the plane part 201d toward the plane part 201b on an opposite side with the rotary shaft 2 between the plane part 201d and the plane part 201b, is the longitudinal direction of the first terminal 231b and the second terminal 235b, respectively. The first terminal 231b and the second terminal 235b have symmetrical shapes with respect to a plane passing through the rotary shaft 2 when seen from above and perpendicular to the Y direction (that is, a plane in parallel with the plane part 201c or the plane part 201a, and passing through the rotary shaft 2), respectively. The first terminal 231b extends from the wiring 231d held in the holder 210 to a position in the vicinity of the plane part 201d, while inclining so as to gradually approach the rotary shaft 2 in the Y direction. The tip end portion of the first terminal 231b is bent so as to move away from the rotary shaft 2 in the Y direction.

A dimension of the motor terminal 26 in the X direction is larger than the dimension in the Y direction. That is, the longitudinal direction of a section perpendicular to the up-and-down direction of the motor terminal 26 is the X direction. The longitudinal direction of a section perpendicular to the up-and-down direction of the motor terminal 26, and the longitudinal direction of the first terminal 231b and the second terminal 235b are in the same direction.

The first terminal 231b can be deflected so that the tip end portion is displaced in the Y direction. That is, the two terminals 231b and 235b are capable of moving close to or moving away from each other.

The first terminal 231b is located inside an insertion port (hereinafter, referred to as an external terminal plug-in part) 281 provided at the holder 210 to which an external terminal is inserted. The external terminal plug-in part 281 is an opening portion, and hereinafter, may be referred to as an insertion portion. The external terminal plug-in part 281 includes an inner wall surface 281b and an outer wall surface 281c each including a surface parallel to the plane part 201c (that is, a surface extending in the longitudinal direction of the first terminal 231). The inner wall surface 281b is located inside than the first terminal 231b in the Y direction (the side close to the rotary shaft 2), and the outer wall surface 281c is located outside than the first terminal 231b in the Y direction (the side away from the rotary shaft 2).

The second terminal 235b is located inside an insertion port (hereinafter, referred to as an external terminal plug-in part) 282 provided at the holder 210, to which an external terminal is inserted. The external terminal plug-in part 282 is an opening portion, and hereinafter, may be referred to as an insertion portion. The external terminal plug-in part 282 includes an inner wall surface 282b and an outer wall surface 282c each including a surface parallel to the plane part 201c (that is, a surface extending in the longitudinal direction of the second terminal 235). The inner wall surface 282b is located inside than the second terminal 235b in the Y direction, and the outer wall surface 282c is located outside than the second terminal 235b in the Y direction.

That is, the terminal part 330b includes the external terminal plug-in part 281 serving as an insertion portion, and the first terminal 231b serving as a terminal provided inside the external terminal plug-in part 281. Moreover, the terminal part 330b includes the external terminal plug-in part 282 serving as an insertion portion, and the second terminal 235b serving as a terminal provided inside the external terminal plug-in part 282. Then, the first terminal 231b extends in the longitudinal direction (X direction) of the external terminal plug-in part 281, and the second terminal 235b extends in the longitudinal direction (X direction) of the external terminal plug-in part 282. The external terminal plug-in part 281 and the first terminal 231b, and the external terminal plug-in part 282 and the second terminal 235b are arranged at symmetrical positions with respect to the rotary shaft 2 in the Y direction, so as to face each other in the Y direction.

In the present embodiment, the two motor terminals 26 are located between the two terminals 231b and 235b and the PTC thermistor 180, in the longitudinal direction of the two terminals 231b and 235b, that is, in the X direction. In the present embodiment, the motor terminal 26 on the plane part 201c side connected to the motor-side terminal piece 231a, and the motor terminal 26 on the plane part 201a side connected to the motor-side terminal piece 133a are arranged facing each other in the radial direction. That is, the two motor terminals 26 are at symmetrical positions with respect to the rotary shaft 2 in the Y direction.

In the X direction, the wiring part of the first system is arranged between the motor terminal 26 on the plane part 201c side and the first terminal 231b. Moreover, the wiring part of the second system extends from the motor terminal 26 on the plane part 201a side toward the plane part 201b side through the PTC thermistor 180, bypassing the motor terminal 26 on the plane part 201a side, and is drawn to the second terminal 235b. That is, the wiring 235d of the wiring part of the second system is an extra length portion.

As illustrated in FIG. 14, the external terminal plug-in parts 281 and 282 are opened to the outside of the terminal unit 200 at the plane part 201d. The two terminals 231b and 235b are arranged at positions that can be seen through the openings of the external terminal plug-in parts 281 and 282, from the outside of the terminal unit 200.

Figure 15:
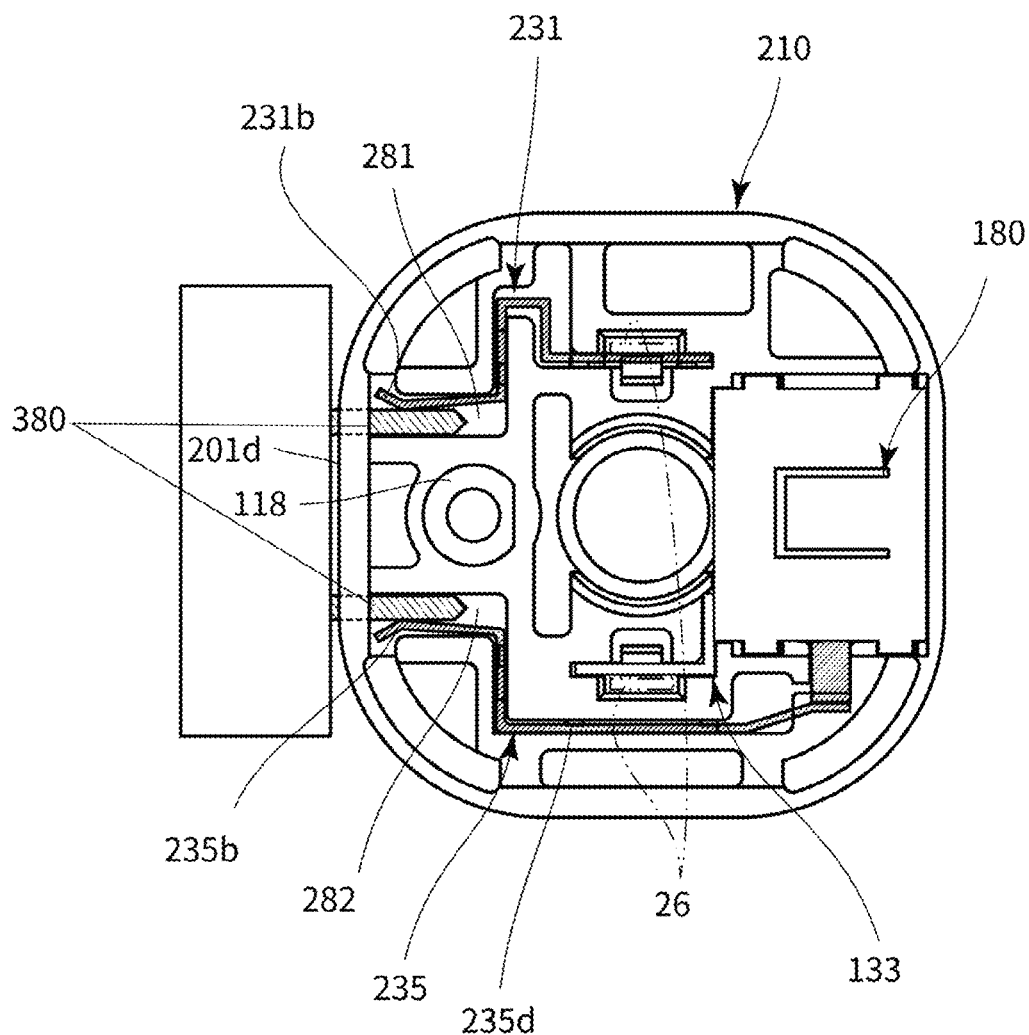
FIG. 15 is a top view illustrating the terminal unit in a state in which an external terminal is connected.
Figure 15:
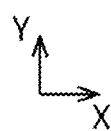

FIG. 15 is a top view illustrating the terminal unit 200 in a state in which an external terminal is connected.

As illustrated in FIG. 15, by inserting the external terminal 380 to each of the external terminal plug-in parts 281 and 282, the two terminals 231b and 235b are brought into contact with the external terminals 380, and the external terminal 380 and the motor terminal 26 can be electrically connected through the PTC thermistor 180. When the external terminal 380 is inserted, the first terminal 231b is deformed by coming into contact with the external terminal 380, and the tip end portion of the first terminal 231b is displaced outwardly in the Y direction. Similarly, when the external terminal 380 is inserted, the second terminal 235b is deformed by coming into contact with the external terminal 380, and the tip end portion of the second terminal 235b is displaced outwardly in the Y direction. Each of the two terminals 231b and 235b is elastically deformed, and is pressed against the external terminal 380 by a restoring force to the original shape. Therefore, a state in which the two terminals 231b and 235b are in contact with the external terminals 380 is reliably maintained.

The two terminals 231b and 235b are located inside the external terminal plug-in parts 281 and 282. Thus, for example, even if an abnormal force is applied to each of the terminals 231b and 235b such that the external terminal 380 is inserted in an improper direction, each of the terminals 231b and 235b contacts to the inner wall surfaces 281b and 282b or the outer wall surfaces 281c and 282c in a state of deflecting within a range of elastic deformation, and will not deform any further. Therefore, the two terminals 231b and 235b can be prevented from being plastically deformed.

The first terminal member 231 and the second terminal member 235 may include a male-type terminal capable of connecting to an external circuit, instead of the first terminal 231b and the second terminal 235b. The male-type terminal, for example, only needs to be constituted to protrude from the holder 110 and be capable of connecting the female-type terminal or a lead wire provided in the external circuit, and the like. Moreover, the first terminal member 231 and the second terminal member 235 may be used while a lead wire or the like is connected as in the first embodiment.

As illustrated in FIG. 13, in the present embodiment, at a part of the holder 210 between the two terminals 231b and 235b, the recess portion 118 serving as a fixing portion fixed to the motor body 1c, is provided. Similar to the first embodiment, in the recess portion 118, the hole part 118a is provided.

Figure 16:
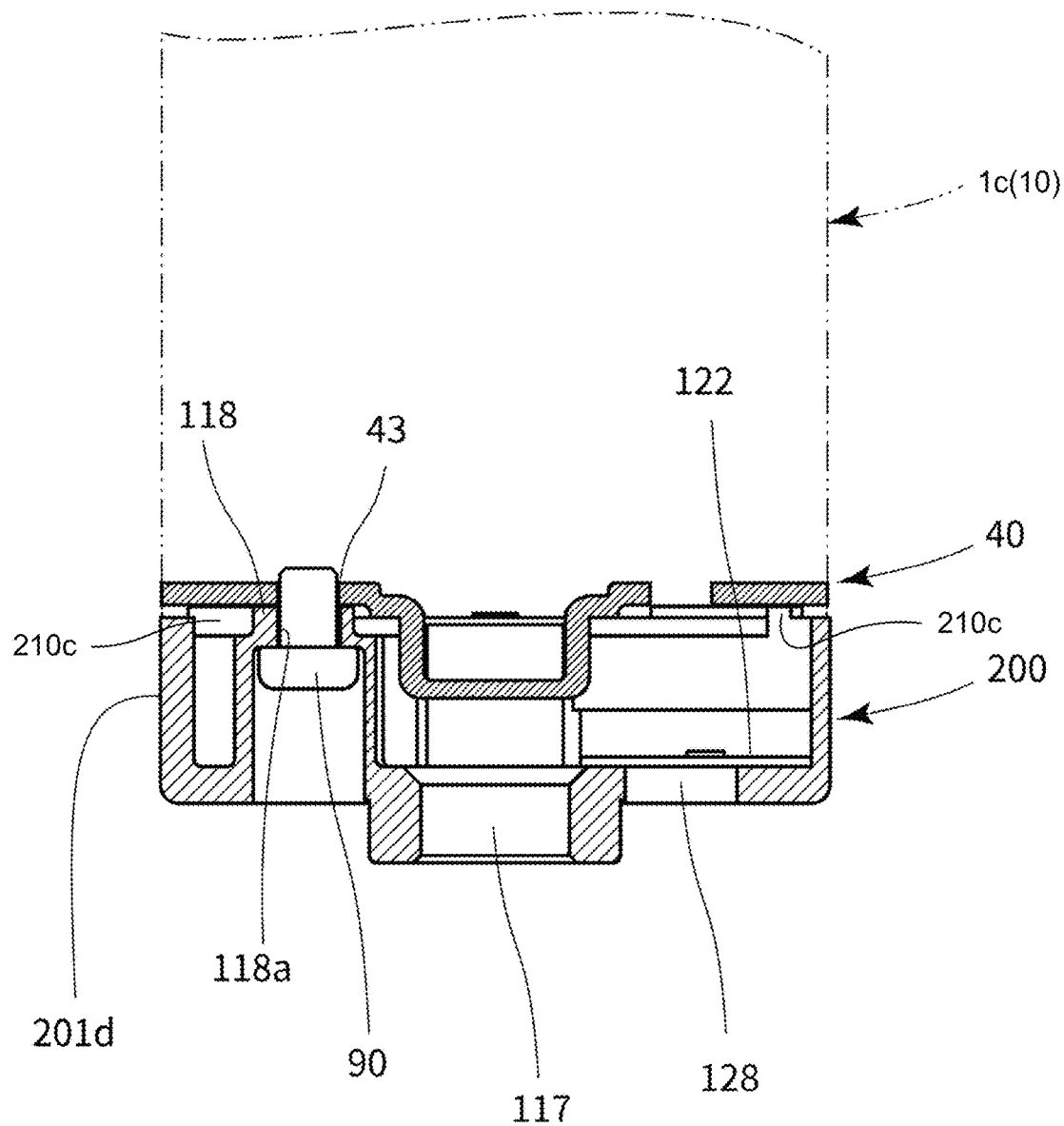
FIG. 16 is a sectional view on a D-D line in FIG. 13.
Figure 16:
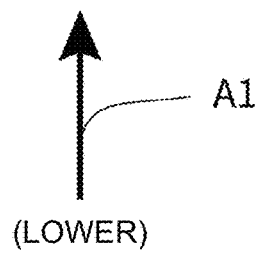

FIG. 16 is a sectional view on a D-D line in FIG. 13.

In FIG. 16, illustrations of the terminal unit 200, the upper-side terminal member 133, and the PTC thermistor 180 are omitted. Moreover, the plate 40 in the motor body 1c connected to the terminal unit 200 is illustrated.

As illustrated in FIG. 16, in the second embodiment, the terminal unit 200 and the motor body 1c are connected to each other using a fastening member 90. The fastening member 90 is a screw, for example. The fastening member 90 is inserted into the recess portion 118 from the lower side of the holder 210, and is arranged so that the upper end portion (tip end portion) passes through the hole part 118a and protrudes above the upper surface of the holder 210. The fastening member 90 is screwed into the hole part 43 provided at the plate 40. That is, the fastening member 90 for fixing the holder 210 and the motor body 1c is provided in the hole part 118a, and the hole part 43 to which the fastening member 90 is inserted is formed at the plate 40.

A member such as a rivet may be used as the fastening member 90 instead of a screw, for example.

As described above, similar to the first embodiment, the motor 1 in the second embodiment includes a structure such that the terminal unit 200 accommodating the PTC thermistor 180 is fixed to the bottom part of the motor body 1c. Thus, the same advantages as in the first embodiment can be obtained.

In the second embodiment, in the radial direction, the terminal part 330b and the PTC thermistor 180 are arranged so as to face each other. Thus, a gap between the terminal part 330b and the PTC thermistor 180 can be increased, and at the inside of the holder 210, the positions of the wirings 231d and 235d can be set easily.

Because the fastening member 90 for fixing the terminal unit 200 and the motor body 1c is used, the terminal unit 200 and the motor body 1c are more firmly fixed. Thus, even if a force is applied from the outside, the terminal unit 200 and the motor body 1c will not be easily disassembled. Moreover, the position of the fastening member 90 is closer to the plane part 201d side to which the external terminal 380 is inserted than the engaging portion with the motor terminal 26, and is in the vicinity of the plane part 201d. Therefore, even if a force is applied to the terminal unit 200, when the external terminal 380 is inserted into the terminal unit 200 or is removed from the terminal unit 200, moment to displace the terminal unit 200 with respect to the motor body 1c is reduced, and can reliably prevent the terminal unit 200 from being damaged, or the terminal unit 200 and the motor body 1c from being disassembled. In particular, because the external terminal 380 is provided between the two terminals 231b and 235b, when the external terminal 380 in contact with the two terminals 231b and 235b is used, the advantages described above become more obvious.

The longitudinal direction of a section perpendicular to the up-and-down direction of the motor terminal 26 and the longitudinal direction of the first terminal 231b and the second terminal 235b are substantially in the same direction. That is, a direction the external terminal 380 is inserted into and removed from the terminal unit 200 (X direction) is substantially matched with the longitudinal direction of a section perpendicular to the up-and-down direction of the motor terminal 26. In other words, the motor terminal 26 in the holder 210 extends long in the longitudinal direction of the insertion portion (external terminal plug-in part 281 and external terminal plug-in part 282). As a result, the insertion direction of the external terminal 380 is a direction toward which the motor terminal 26 has a high bending rigidity. Thus, even in a case of connecting the terminal unit 200 and the motor body 1c only by the engagement with the motor terminal 26, without using the fastening member 90, the motor terminal 26 is prevented from being deflected or deformed by the force applied when the terminal unit 200 is inserted or removed. In the second embodiment in a manner that the insertion direction of the external terminal 380 is a direction toward which the motor terminal 26 has a high bending rigidity, the terminal unit 200 can be fixed to the motor body 1c in a manner that the location where the motor body 1c and the terminal unit 100 are fitted to each other is only the fitting part between the motor terminal 26 and the motor terminal connection portion (motor-side terminal piece 131a or motor-side terminal piece 133a).

Figure 17:
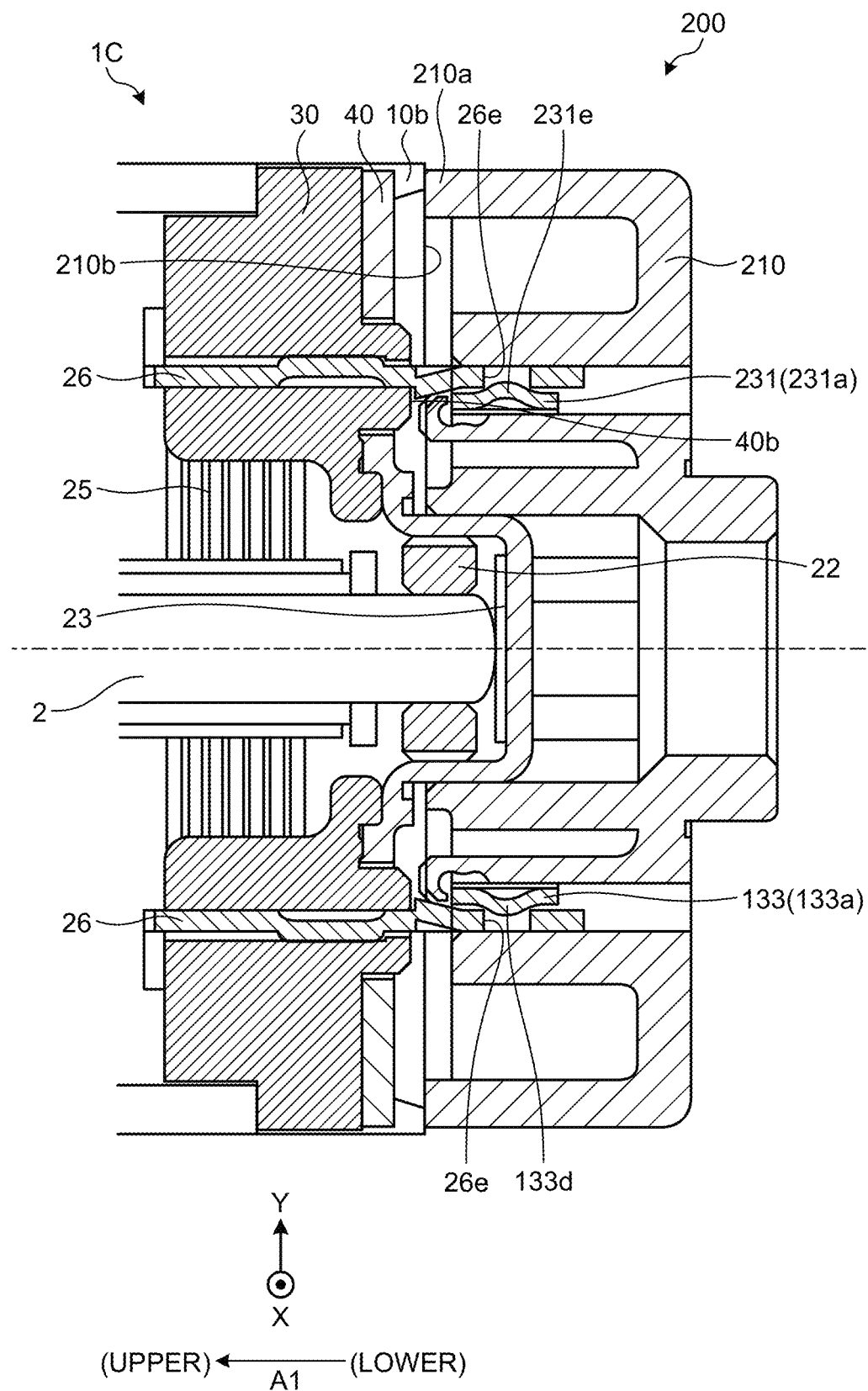
FIG. 17 is a diagram for explaining connection between a motor body and the terminal unit in the second embodiment.

That is, the connection between the motor body 1c and the terminal unit 200 may only be performed by fitting one of the motor terminals 26 to the motor-side terminal piece 231a, and fitting the other motor terminal 26 to the motor-side terminal piece 133a. FIG. 17 is a diagram for explaining the connection between the motor body 1c and the terminal unit 200 in the second embodiment. FIG. 17 illustrates a part of a cross-section in parallel with the plane part 201b and cut by a plane passing through the motor terminal 26, in a state in which the terminal unit 200 illustrated in FIG. 13 is connected to the motor body 1c only by fitting the motor terminal 26 to the motor terminal connection portion.

As illustrated in FIG. 17, a part of the surface of the motor-side terminal piece 231a facing one of the motor terminals 26 and a part of the surface of the motor-side terminal piece 133a facing the other motor terminal 26 protrude. For example, on the motor-side terminal piece 133a, as an engaging portion, the projection portion 133d illustrated in FIG. 11 is provided. Moreover, on the motor-side terminal piece 231a, as an engaging portion, a projection portion 231e is provided. As described above, a specific shape of the motor-side terminal piece 231a is substantially the same as the motor-side terminal piece 131a of the third terminal member 131, and a specific shape of the projection portion 231e is substantially the same as the projection portion 133d. That is, the projection portion 231e is formed so that a part of the motor-side terminal piece 231a is pushed out in a direction intersecting with the motor-side terminal piece 231a (perpendicular direction in the embodiment), and is raised from the motor-side terminal piece 231a. The projection portion 231e is formed so as to protrude toward the motor terminal 26 connected to the motor-side terminal piece 231a. The projection portion 133d protrudes in a direction intersecting with the rotary shaft direction (substantially perpendicular direction in the embodiment).

Then, on the surface of the motor terminal 26 facing a part (for example, projection portion 231e or projection portion 133d) of the surface of the motor terminal connection portion (motor-side terminal piece 231a or motor-side terminal piece 133a), as an engaged portion, the hole part 26e is provided. On the motor terminal 26, as an engaged portion, a recess portion may be provided.

At this time, if the insertion direction of the external terminal 380 is in the Y direction, a force applied from the outside by inserting the external terminal 380 may be applied in a direction of removing the fitting part between the motor terminal 26 and the motor terminal connection portion (motor-side terminal piece 231a or motor-side terminal piece 133a). However, in the second embodiment, the insertion direction of the external terminal 380 is in the X direction. Thus, the force applied from the outside by inserting the external terminal 380 is in a direction intersecting with (substantially perpendicular direction in the embodiment) the direction of removing the fitting part between the motor terminal 26 and the motor terminal connection portion (motor-side terminal piece 231a or motor-side terminal piece 133a). Thus, the effect on the fitting part is small. As a result, in the second embodiment, the fitting between the motor terminal 26 and the motor terminal connection portion can be maintained.

Figure 18:
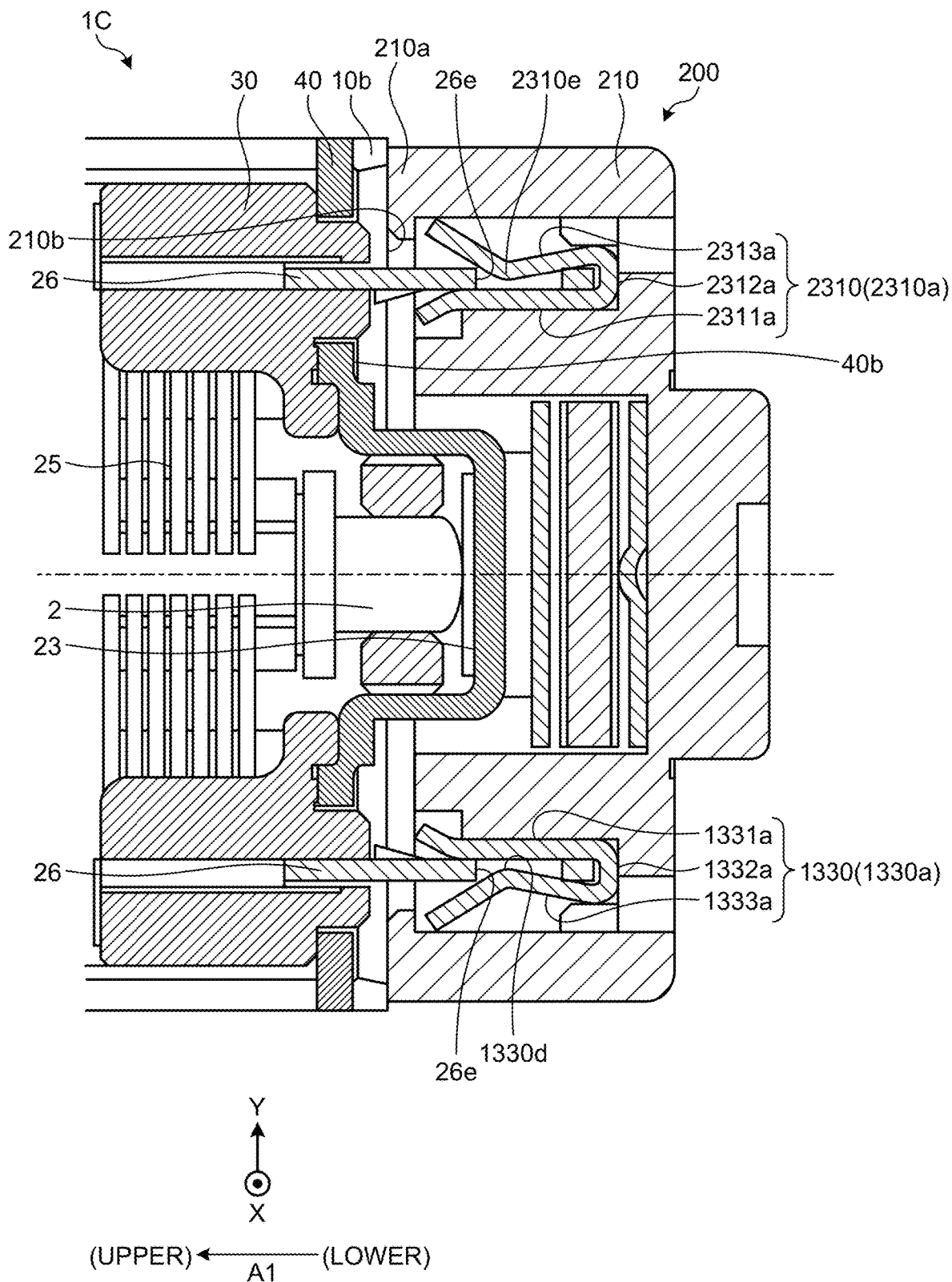
FIG. 18 is a diagram for explaining a modification of the connection between the motor body and the terminal unit in the second embodiment.

The engagement of the motor terminal 26 and the motor terminal connection portion is not limited to the one illustrated in FIG. 17. This will be explained using FIG. 18. FIG. 18 is a diagram for explaining a modification of the connection between the motor body 1c and the terminal unit 20 in the second embodiment.

In the present modification, a first terminal member 2310 is used instead of the first terminal member 231. The first terminal member 2310 is a member including a motor-side terminal piece 2310a replacing the motor-side terminal piece 231a in the first terminal member 231. Moreover, in the present modification, an upper-side terminal member 1330 is used instead of the upper-side terminal member 133. The upper-side terminal member 1330 is a member including a motor-side terminal piece 1330a replacing the motor-side terminal piece 133a in the upper-side terminal member 133.

The motor-side terminal piece 2310a includes a first plane part 2311a, a connecting part 2312a, and a second plane part 2313a. The first plane part 2311a is substantially parallel to the plane part 201a, and extends in the rotary shaft direction (arrow A1). The connecting part 2312a intersects with the plane part 201a (substantially perpendicular in the embodiment), and extends in the Y direction. The first plane part 2311a is connected to one of the end portions (an end portion at a side closer to the rotary shaft 2, an end portion in the Y direction negative side) of the connecting part 2312a, and the second plane part 2313a is connected to the other end portion (an end portion at a side away from the rotary shaft 2, an end portion in the Y direction positive side) of the connecting part 2312a. The second plane part 2313a extends in the rotary shaft direction from the other end portion of the connecting part 2312a. The second plane part 2313a extends so as to approach the first plane part 2311a toward the motor body 1c side (upper side), and then extends so as to move away from the first plane part 2311a. That is, the second plane part 2313a is bent, and thus a projection portion 2310e protruding in the Y direction negative side is formed.

The motor-side terminal piece 1330a includes a first plane part 1331a, a connecting part 1332a, and a second plane part 1333a. The first plane part 1331a is substantially parallel to the plane part 201c, and extends in the rotary shaft direction (arrow A1). The connecting part 1332a is substantially perpendicular to the plane part 201c, and extends in the Y direction. The first plane part 1331a is connected to one of the end portions (an end portion at a side closer to the rotary shaft 2, an end portion in the Y direction positive side) of the connecting part 1332a, and the second plane part 1333a is connected to the other end portion (an end portion at a side away from the rotary shaft 2, an end portion in the Y direction negative side) of the connecting part 1332a. The second plane part 1333a extends in the rotary shaft direction from the other end portion of the connecting part 1332a. The second plane part 1333a extends so as to approach the first plane part 1331a toward the motor body 1c side (upper side), and then extends so as to move away from the first plane part 1331a. That is, the second plane part 1333a is bent, and thus a projection portion 1330d protruding in the Y direction positive side is formed.

That is, on the motor-side terminal piece 2310a, as an engaging means, the projection portion 2310e is provided, and on the motor-side terminal piece 1330a, as an engaging means, the projection portion 1330d is provided. Then, at the surface of the motor terminal 26 facing a part (for example, projection portion 2310e or projection portion 1330d) of the surface of the motor terminal connection portion (motor-side terminal piece 2310a or motor-side terminal piece 1330a), as an engaged portion, the hole part 26e is provided. On the motor terminal 26, as an engaged portion, a recess portion may be provided.

In the modification illustrated in FIG. 18, one of the motor terminals 26 is sandwiched between the first plane part 2311a and the second plane part 2313a, in a state where the projection portion 2310e is fitted into the hole part 26e, and the other motor terminal 26 is sandwiched between the first plane part 1331a and the second plane part 1333a, in a state where the projection portion 1330d is fitted into the hole part 26e. As a result, in the present modification, the motor body 1c and the terminal unit 20 can be connected more firmly.

The holder 210 includes an outer peripheral end portion 210a facing the outer peripheral end portion 10b of the frame 10 in the shaft direction of the motor 1 (see FIG. 14, FIG. 17, and FIG. 18). The outer peripheral end portion 210a of the holder 210, as illustrated in FIG. 14, FIG. 17, and FIG. 18, includes a surface 210b facing the outer peripheral end portion 10b of the frame 10 in the shaft direction of the motor 1. Moreover, the outer peripheral end portion 210a of the holder 210, as illustrated in FIG. 14 and FIG. 16, includes a plurality of protrusion portions 210c protruding toward the plate 40 being the bottom part of the motor body 1c from the surface 210b in the shaft direction of the motor 1. These protrusion portions 210c face the plate 40 being the bottom part of the motor body 1c, and come into contact with the inner surface of the outer peripheral end portion 10b of the frame 10. By the protrusion portions 210c, the terminal unit 200 is positioned (guided) with respect to the frame 10.

Moreover, the plate 40 being the bottom part of the motor body 1c and the holder 210 are mutually separable. Specifically, in the shaft direction of the motor 1, the surface 40b of the plate 40 being the bottom part of the motor body 1c and the surface 210b of the holder 210 facing each other are mutually separable. Moreover, the motor body 1c includes the frame 10, and the frame 10 and the holder 210 are mutually separable. Specifically, in the shaft direction of the motor 1, the outer peripheral end portion 10b of the frame 10 and the outer peripheral end portion 210a of the holder 210 facing each other are mutually separable. In this manner, by constituting the bottom part of the motor body 1c and the holder 210, or the frame 10 and the holder 210 mutually separable, the terminal unit can be freely modified according to the application of the motor and the like. Alternatively, the vibration of the motor can be prevented from being transmitted to the terminal unit.

Figure 19:
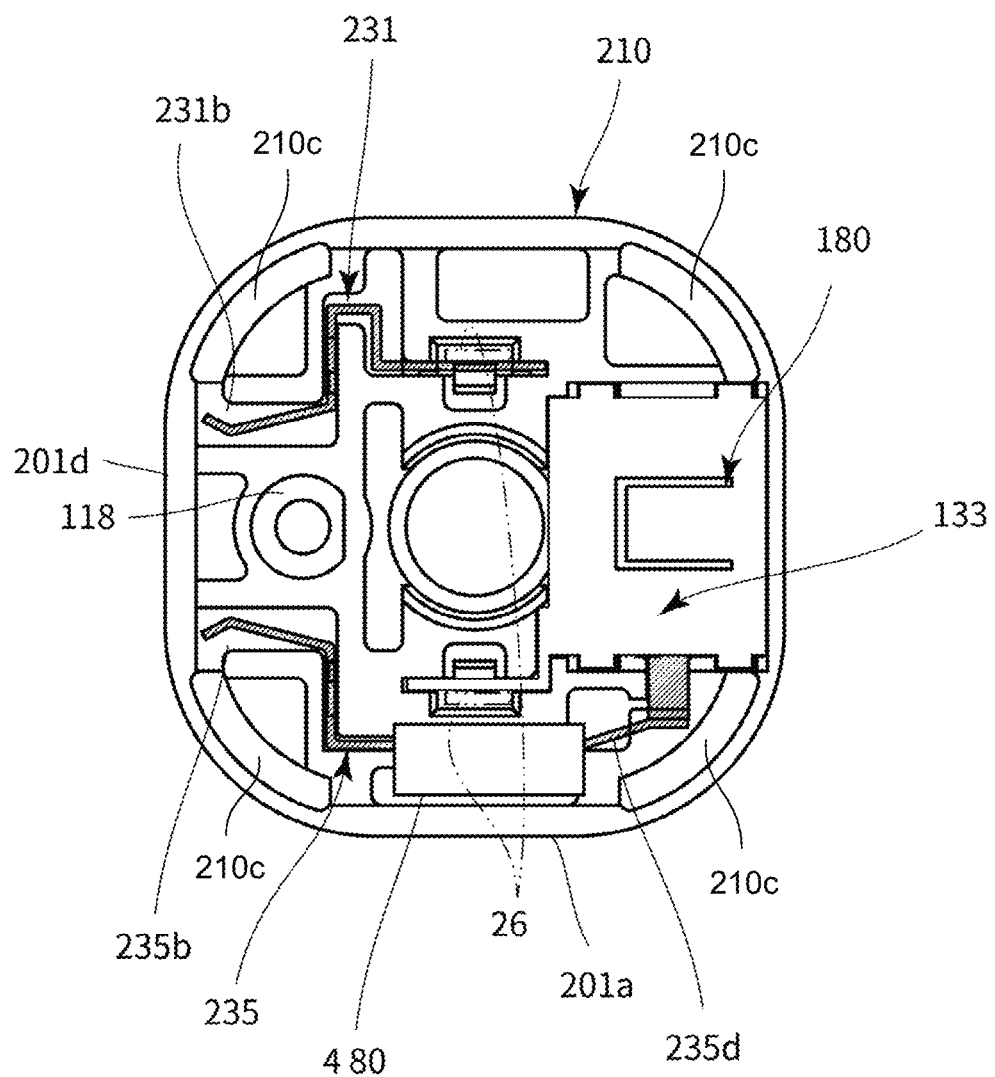
FIG. 19 is a top view illustrating a terminal unit according to one modification of the second embodiment.

FIG. 19 is a top view illustrating a terminal unit 400 according to one modification of the second embodiment.

In the second embodiment, at a portion of the wiring 235d of the wiring part of the second system serving as an extra length portion, another electronic component different from the PTC thermistor 180 may be provided. That is, as illustrated in FIG. 19, the terminal unit 400 has the wiring 235d capable of connecting a capacitor (an example of another electronic component) 480 different from the PTC thermistor 180.

In this manner, in the second embodiment, in the radial direction, the terminal part 330b and the PTC thermistor 180 are arranged so as to face each other, and the wiring 235d of the wiring part of the second system is drawn by bypassing the motor terminal 26 on the plane part 201a side. Thus, an electronic component different from the PTC thermistor 180 can be arranged in the portion. Therefore, in the terminal unit 400, an area for mounting a plurality of electronic components can be ensured. Because another electronic component to be mounted on the motor body 1c can be mounted on the terminal unit 400 in addition to the PTC thermistor 180, the size of the motor body 1c can be reduced, and the entire size of the motor 1 can be reduced.

Another electronic component different from the PTC thermistor 180 is not limited to the one described above, and various circuit elements and the like may be arranged. For example, a choke coil, an IC (integrated circuit), and the like may be mounted.

OTHERS

The motor may be constituted by combining the features of the embodiments and modifications described above partially. In the embodiments and modifications described above, some components may not be provided or some components may be constituted in another form.

The outer peripheral shape of the terminal unit may be different from the outer peripheral shape of the motor body. The terminal unit may include an outer peripheral shape larger than the outer peripheral shape of the motor body in a direction perpendicular to the rotary shaft direction, or may include a smaller outer peripheral shape.

As an electronic component mounted on the terminal unit, a circuit element such as a choke coil may be provided in addition to the PTC thermistor. Moreover, another electronic component may be arranged on the power feeding line to the motor, instead of the PTC thermistor.

The number of the motor terminal of the motor body is not limited to two but may be larger than two. The terminal unit only needs to include a structure in which the terminal part, the wiring part electrically connecting at least one motor terminal and the terminal part, and the electronic component provided in the middle of the wiring part are arranged, and the terminal connected to the other motor terminal may not be included. In this case, by applying a voltage to the terminal part of the terminal unit and the other motor terminal from the outside of the motor, power can be fed to the motor.

The plate being the bottom part of the motor body and the holder are mutually separable, and may not be fitted together (non-fitted). Specifically, in the shaft direction of the motor, the surface of the plate being the bottom part of the motor body and the surface of the holder facing each other are mutually separable, and may not be fitted together (non-fitted). Moreover, the motor body includes the frame, and the frame and the holder are mutually separable, and may not be fitted together (non-fitted). Specifically, in the shaft direction of the motor 1, the outer peripheral end portion 10*b* of the frame 10 and the outer peripheral end portion 110*a* of the holder 110 facing each other are mutually separable, and may not be fitted together (non-fitted). In this manner, by constituting the bottom part of the motor body 1*c* and the holder 110, or the frame 10 and the holder 110 mutually separable and not fitted together (non-fitted), the terminal unit can be freely modified according to the application of the motor and the like. Alternatively, the vibration of the motor can be prevented from being transmitted to the terminal unit.

The motor constituted as above can be used for various applications. For example, the motor can be used for an electronic device, or may be used for applications mounted on various vehicles.

The embodiments described above should be considered as illustrative and not restrictive in all aspects. The scope of the present disclosure is indicated by the scope of claims rather than the description above, and is intended to include all modifications within the meanings and scope equivalent to the scope of the claims.

REFERENCE SIGNS LIST

1 motor
1*c* motor body
2 rotary shaft
26 motor terminal
40 plate
43 hole part
90 fastening member
100, 200, 400 terminal unit
110, 210 holder
118 recess portion (an example of a fixing portion)
118*a* hole part
131 third terminal
133 upper-side terminal
135 lower-side terminal
180 PTC thermistor (an example of an electronic component)
231 first terminal member
231*b* first terminal
231*d* wiring
235 second terminal member
235*b* second terminal
235*d* wiring
281, 282 external terminal plug-in part
330*b* terminal part
380 external terminal
480 capacitor (an example of another electronic component)

The invention claimed is:

1. A motor, comprising:
a shaft;
a motor body including a frame, a bottom part including a plate closing an opening portion of the frame, and a first motor terminal and a second motor terminal, provided at the bottom part; and
a terminal unit mounted on the bottom part of the motor body, wherein
the terminal unit includes
a holder,
an electronic component and a terminal part fixed to the holder,
a wiring part of a first system electrically connecting the first motor terminal and the terminal part,
a wiring part of a second system electrically connecting the second motor terminal and the terminal part via the electronic component,
a first motor-side terminal piece electrically connecting the first motor terminal,
a second motor-side terminal piece electrically connecting the second motor terminal,
the electronic component is provided at the wiring part of the second system, and
in a longitudinal direction of the terminal unit, the first motor terminal and the second motor terminal are located between the terminal part and the electronic component,
the second motor terminal is arranged inside a part of the wiring part of the second system in the radial direction,
the wiring part of a second system is drawn to the terminal part and bypasses the second motor terminal,
in a radial direction, the terminal part and the electronic component are arranged and opposing each other,
a surface at the plate side of the electronic component is arranged at the holder side with respect to a surface of the plate of the motor body in a rotary shaft direction,
an outer peripheral end portion of the frame and an outer peripheral end portion of the holder facing each other are non-fitted in the rotary shaft direction,
a surface of the plate and a surface of the holder facing each other are non-fitted in the rotary shaft direction,
a part of a surface of the first motor-side terminal piece facing the first motor terminal protrudes,
a recess portion or a hole portion is provided at a surface of the first motor terminal facing a part of the surface of the first motor-side terminal piece,
the part of the surface of the first motor-side terminal piece and the surface of the first motor terminal are fitted,
the holder includes an external terminal plug-in part,
a direction that an external terminal being inserted to the external terminal plug-in part intersects a direction that the first motor terminal extends.

2. The motor according to claim 1, wherein
the first motor terminal and the first motor-side terminal piece are fitted to each other, and the motor body and the terminal unit are connected,
the holder includes an opening portion and a terminal provided inside the opening portion,
the terminal extends in a longitudinal direction of the opening portion, and
the motor terminal in the holder extends long in the longitudinal direction of the opening portion.

3. The motor according to claim 1, wherein
the terminal part includes a first terminal and a second terminal including a contact surface in contact with the external terminal, and
the first terminal and the second terminal are capable of moving close to or moving away from each other.

4. The motor according to claim 3, wherein at a part of the holder between the first terminal and the second terminal, a fixing portion fixed to the motor body is provided.

5. The motor according to claim 4, wherein
a hole part is provided at the fixing portion, and
a fastening member fixing the holder and the motor body is provided in the hole part.

6. The motor according to claim 5, wherein
at the motor body facing the holder, the plate formed with metal is provided, and
a hole part is formed at the plate formed with metal, the fastening member being inserted at the hole part of the plate formed with metal.

7. The motor according to claim 1, wherein
the terminal part includes a first terminal and a second terminal including a contact surface in contact with the external terminal,
the shaft is located between the first motor terminal fitted to the first motor-side terminal piece and the second motor terminal fitted to the second motor-side terminal piece in the radial direction, and
the first terminal and the second terminal are aligned in a direction from the first motor terminal toward the second motor terminal.

8. The motor according to claim 7, wherein the wiring part of the second system includes an extra length portion capable of connecting to another electronic component different from the electronic component, in the holder.

* * * * *